US006964313B2

(12) United States Patent
Phillips, III et al.

(10) Patent No.: US 6,964,313 B2
(45) Date of Patent: Nov. 15, 2005

(54) PERSONAL TRANSPORT VEHICLE, SUCH AS A BICYCLE

(75) Inventors: J. Andrew Phillips, III, Mount Dora, FL (US); J. Andrew Phillips, Jr., Salisbury, MD (US)

(73) Assignee: Biketoo, Incorporated, Salisbury, MD (US)

( * ) Notice: Subject to any disclaimer, the term of this patent is extended or adjusted under 35 U.S.C. 154(b) by 0 days.

(21) Appl. No.: 10/348,984

(22) Filed: Jan. 23, 2003

(65) Prior Publication Data

US 2004/0144584 A1 Jul. 29, 2004

(51) Int. Cl.[7] .......................... B62K 11/00; B62D 61/02

(52) U.S. Cl. ....................................... 180/205; 180/220

(58) Field of Search ................................ 180/205, 206, 180/220, 227, 65.1, 65.2, 65.5, 65.6

(56) References Cited

U.S. PATENT DOCUMENTS

| | | | | | |
|---|---|---|---|---|---|
| 695,562 | A | | 3/1902 | Keating | |
| 1,257,761 | A | | 2/1918 | Strand | |
| 1,540,096 | A | | 6/1925 | West | |
| 2,091,698 | A | | 8/1937 | Anthony et al. | |
| 2,192,867 | A | | 3/1940 | Butt | |
| 2,382,740 | A | | 8/1945 | Noffsinger | |
| 2,575,873 | A | * | 11/1951 | Henney | 180/230 |
| 3,106,101 | A | | 10/1963 | Harriman | |
| 3,838,606 | A | | 10/1974 | Scalise | |
| 4,036,069 | A | | 7/1977 | Clark | |
| 4,140,195 | A | | 2/1979 | Watanabe et al. | |
| 4,169,512 | A | | 10/1979 | Ishikawa et al. | |
| 4,234,050 | A | | 11/1980 | Condon | |
| 4,346,772 | A | | 8/1982 | Clifft | |
| 4,393,954 | A | | 7/1983 | Soucy et al. | |
| 4,576,269 | A | | 3/1986 | Hamane et al. | |
| 4,711,635 | A | | 12/1987 | Arnce | |
| 4,798,562 | A | | 1/1989 | Matson et al. | |
| 4,799,567 | A | | 1/1989 | Gaddi | |
| 5,076,386 | A | | 12/1991 | Ferneding | |
| 5,393,271 | A | | 2/1995 | Sands | |
| 5,679,084 | A | | 10/1997 | Daniels, III | |
| 5,941,332 | A | | 8/1999 | Dimick | |
| 6,011,366 | A | * | 1/2000 | Murakami et al. | 318/1 |
| 6,024,186 | A | * | 2/2000 | Suga | 180/291 |
| 6,062,329 | A | | 5/2000 | Chai | |
| 6,073,717 | A | | 6/2000 | Yamamoto et al. | |
| 6,119,801 | A | | 9/2000 | Yamashita et al. | |
| 6,164,676 | A | | 12/2000 | Wilcox | |
| 6,213,236 | B1 | | 4/2001 | Yokoyama | |
| 6,286,642 | B1 | | 9/2001 | Yi | |
| 6,338,393 | B1 | | 1/2002 | Martin | |
| 6,598,693 | B2 | * | 7/2003 | Honda et al. | 180/205 |
| 6,629,574 | B2 | * | 10/2003 | Turner | 180/206 |

* cited by examiner

*Primary Examiner*—Tony Winner
(74) *Attorney, Agent, or Firm*—Dinesh Agarwal, P.C.

(57) ABSTRACT

A personal transport vehicle includes a frame with front and rear suspensions. The front suspension supports a front wheel and the rear suspension supports a rear wheel for up and down movement relative to the frame. A manual drive assembly is operably connected to the frame, and a separate power drive assembly forms a part of the rear suspension. The vehicle can be used by pedal power only, motor power only, or a combination of pedal and motor powers.

40 Claims, 25 Drawing Sheets

Low Gear–
Low Gear engages
bearing which locks
onto output shaft

High Gear–
Output shaft which
is keyed directly
to the High Gear is
allowed to rotate
within Low gear.
(Low Gear is in idle)

PERSONAL TRANSPORT VEHICLE, SUCH AS A BICYCLE

BACKGROUND OF THE INVENTION

The present invention is generally directed to personal transport vehicles, and more particularly to a personal transport vehicle, such as a bicycle, which can be ridden by using pedal power only, motor power only, or a combination of pedal power and motor power simultaneously.

The prior art is replete with a variety of bicycles or the like personal transport vehicles, that are pedal-powered or power-assisted. Illustrative examples of the conventional vehicles of this type are disclosed in U.S. Pat. Nos. 695,562; 1,257,761; 1,540,096; 2,091,698; 2,192,867; 2,382,740; 3,106,101; 3,838,606; 4,036,069; 4,140,195; 4,169,512; 4,346,772; 4,393,954; 4,576,269; 4,711,635; 4,798,562; 4,799,567; 5,076,386; 5,393,271; 5,679,084; 5,941,332; 6,062,329; 6,073,717; 6,119,801; 6,164,676; 6,213,236 B1; 6,286,642 B1; and 6,338,393 B1.

Conventional vehicles typically use an automatic freewheel. In other words, the standard in the bicycle industry has been to provide a drive and/or a driven sprocket that engages in one direction, but turns freely in the other, automatically. This arrangement has two inherent problems. First, when the throttle is released, the freewheel device allows the motor to return to idle with the final drive components slowing to a complete stop. In this instance, the motor provides no braking for the drive assembly, which slows down on its own accord. Second, when the throttle is advanced or opened, the motor must bring the transmission and the drive components up to the speed of the vehicle wheel. Since the drive components are typically at a zero speed and the vehicle wheel at significantly above the zero speed, the difference of rotational inertia between the two, causes the freewheel device to engage abruptly leading to a great level of shock or jolt throughout the entire driveline. This unacceptable level of shock or jolt not only adversely affects the integrity of the various components, it negatively impacts the ability of the operator or rider to maintain control of the vehicle at any speed.

In view of the drawbacks associated with conventional personal transport vehicles, such as bicycles, there is a need in the industry for a personal transport vehicle, which allows a rider to use the vehicle in pedal power, motor power, or a combination of pedal power and motor power simultaneously, without any adverse impact on the transmission, or without impacting the ability of the rider to operate the vehicle in a safe and proper manner without losing control.

OBJECTS AND SUMMARY OF THE INVENTION

The principal object of the present invention is to provide a personal transport vehicle which overcomes the drawbacks associated with conventional vehicles.

An object of the present invention is to provide a personal transport vehicle which can be ridden by using motor power only, pedal power only (without any energy loss through motor drive components), or by using a combination of pedal power and motor power simultaneously.

Another object of the present invention is to provide a personal transport vehicle in which the drive motor is mounted longitudinally and is inverted. The motor, the transaxle assembly, the rear swing arm and the rear wheel form an integrated unit. The motor and the transaxle assembly are located substantially centrally of the vehicle frame thereby allowing the weight to be distributed equally between the front and rear wheels with any heat and noise behind the operator. This construction results in a weight-balanced vehicle providing significant comfort to the rider offering a new level of exhilarating experience and performance combined with improved control.

Yet another object of the present invention is to provide a personal transport vehicle in which the seat and the transaxle assembly are generally vertically aligned along a central axis of the vehicle frame thereby further balancing the weight between the front and rear of the vehicle.

Still yet another object of the present invention is to provide a personal transport vehicle which can be ridden off-road.

A further object of the present invention is to provide a personal transport vehicle which does not need to be assisted. The vehicle can propel a full size person from zero to about thirty mph off-road without pedaling.

Yet a further object of the present invention is to provide a personal transport vehicle in which the motor can be easily removed for any reason, including servicing thereof. The vehicle retains pedal capability while the motor is being serviced or remains off the vehicle. This arrangement offers versatility and convenience to the rider in that the vehicle can be used with or without motor power.

Still yet a further object of the present invention is to provide a personal transport vehicle which is compact and light-weight since the transaxle unit or assembly is an integral part of the vehicle frame or the rear suspension.

An additional object of the present invention is to provide a personal transport vehicle which includes a power drive assembly separate and independent from a manual drive assembly. The power drive assembly includes a split-sprocket which can be removed without first having to disassemble and remove the rear wheel from the frame or swing arm. The ease of removing or replacing split-sprocket allows various ratio changes for multiple riding applications.

Yet an additional object of the present invention is to provide a personal transport vehicle which includes a chain guide with an adjustable internal ramp for providing rough terrain capability or minimizing the drive chain slipping off the sprockets.

Still yet an additional object of the present invention is to provide a personal transport vehicle which includes a removable fuel tank, thereby further adding versatility to the use of the vehicle.

A further object of the present invention is to provide a personal transport vehicle which includes a quick manually operable disconnect mechanism for deactivating or disengaging the chain drive sprocket rotatably attached to the transaxle output shaft, while the vehicle is being pedaled and/or is not under power. This manual release allows the vehicle to be used in pedal power mode, without any energy loss through the transmission.

Yet a further object of the present invention is to provide a personal transport vehicle in which the motor is not an integral part of the transmission and is easily removable therefrom. As a result, the rotation of the motor can be easily changed from clockwise to counterclockwise, and vice-versa, and different kinds (gasoline, diesel, electric, two-stroke, four-stroke, etc.) of motors can be used.

In summary, the main object of the present invention is to provide a personal transport vehicle, such as a bicycle, which is versatile in that it can be used in pedal power only, motor power only, or a combination of pedal power and motor power. The vehicle is versatile in that it is compact, light-weight and offers significantly improved maneuverability and control of the vehicle during use.

In accordance with a first aspect of the invention, the personal transport vehicle of the invention includes a frame with front and rear suspensions. The front suspension supports a front wheel and the rear suspension supports a rear wheel for up and down movement relative to the frame. A manual drive assembly is operably connected to the frame, and a power drive assembly forms a part of the rear suspension.

In accordance with a second aspect of the present invention, a bicycle includes a frame with front and rear suspensions. The front suspension supports a front wheel and the rear suspension supports a rear wheel. A manual drive assembly is operably connected to the frame. A power drive assembly, including a full-time driveline, forms a part of the rear suspension.

In accordance with a third aspect of the present invention, a personal transport vehicle frame includes a support structure for supporting a wheel. A power drive assembly, including a full-time driveline, forms a part of the support structure.

In accordance with a fourth aspect of the present invention, a bicycle frame includes front and rear supports. A power drive assembly, including a full-time driveline, forms a part of one of the front and rear supports. In particular, the power drive assembly forms a part of the rear support.

BRIEF DESCRIPTION OF THE DRAWINGS

The above and other objects, novel features and advantages of the present invention will become apparent from the following detailed description of the invention, as illustrated in the drawings, in which.

DETAILED DESCRIPTION OF THE INVENTION

Figure 1:
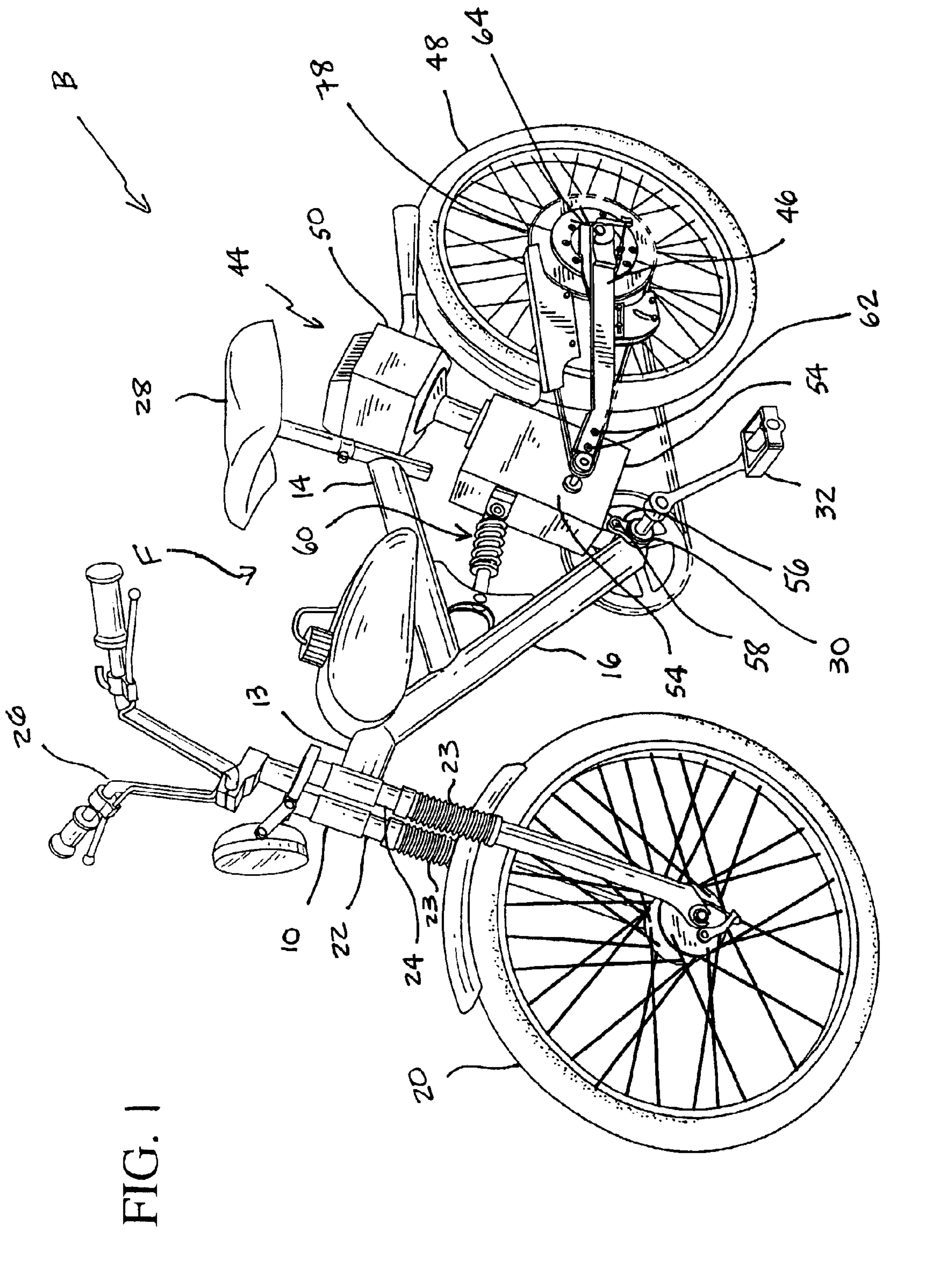
FIG. 1 is a right perspective view of the personal transport vehicle of the present invention.
Figure 2:
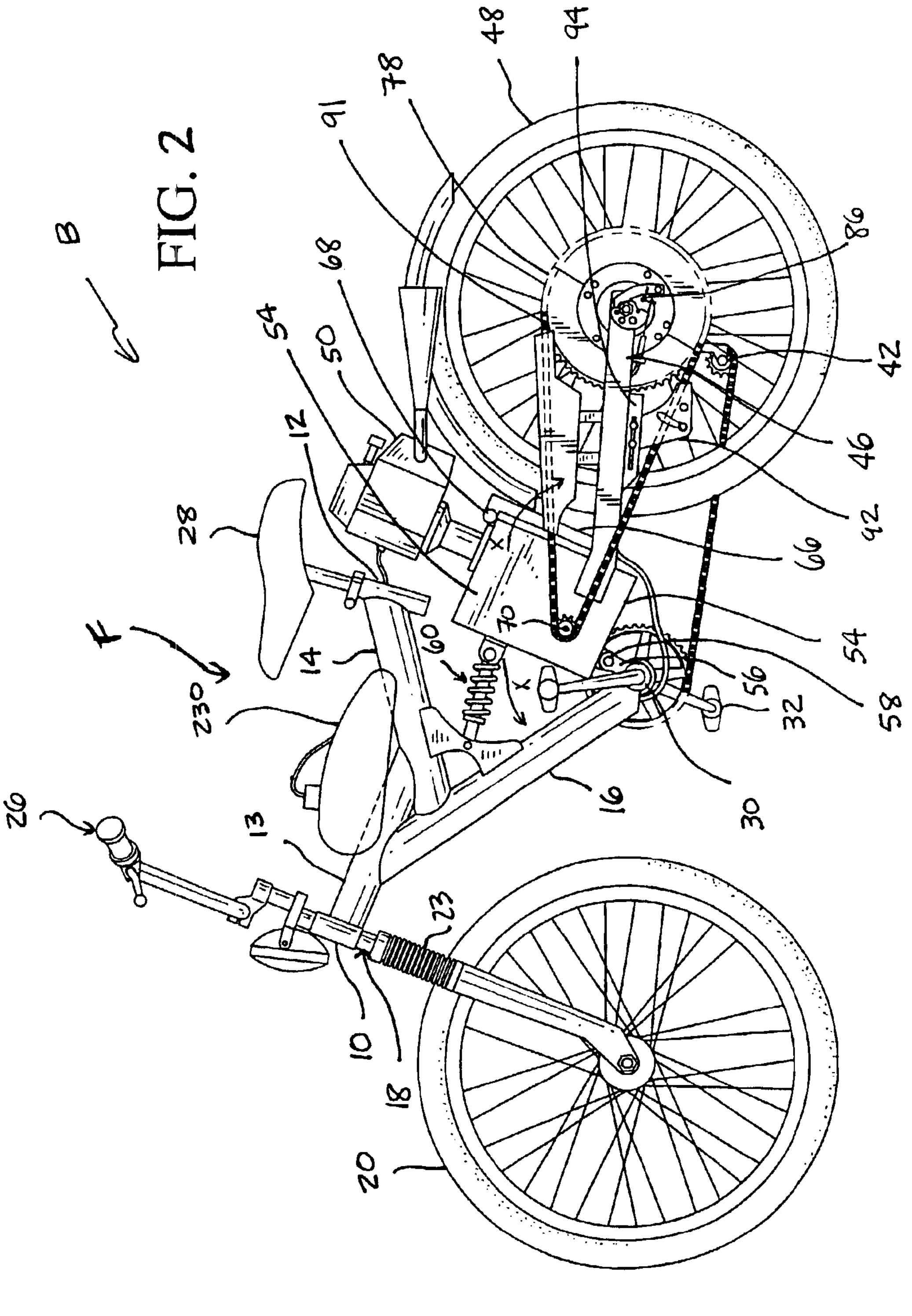
FIG. 2 is a right side elevational view of the personal transport vehicle shown in FIG. 1.
Figure 3:
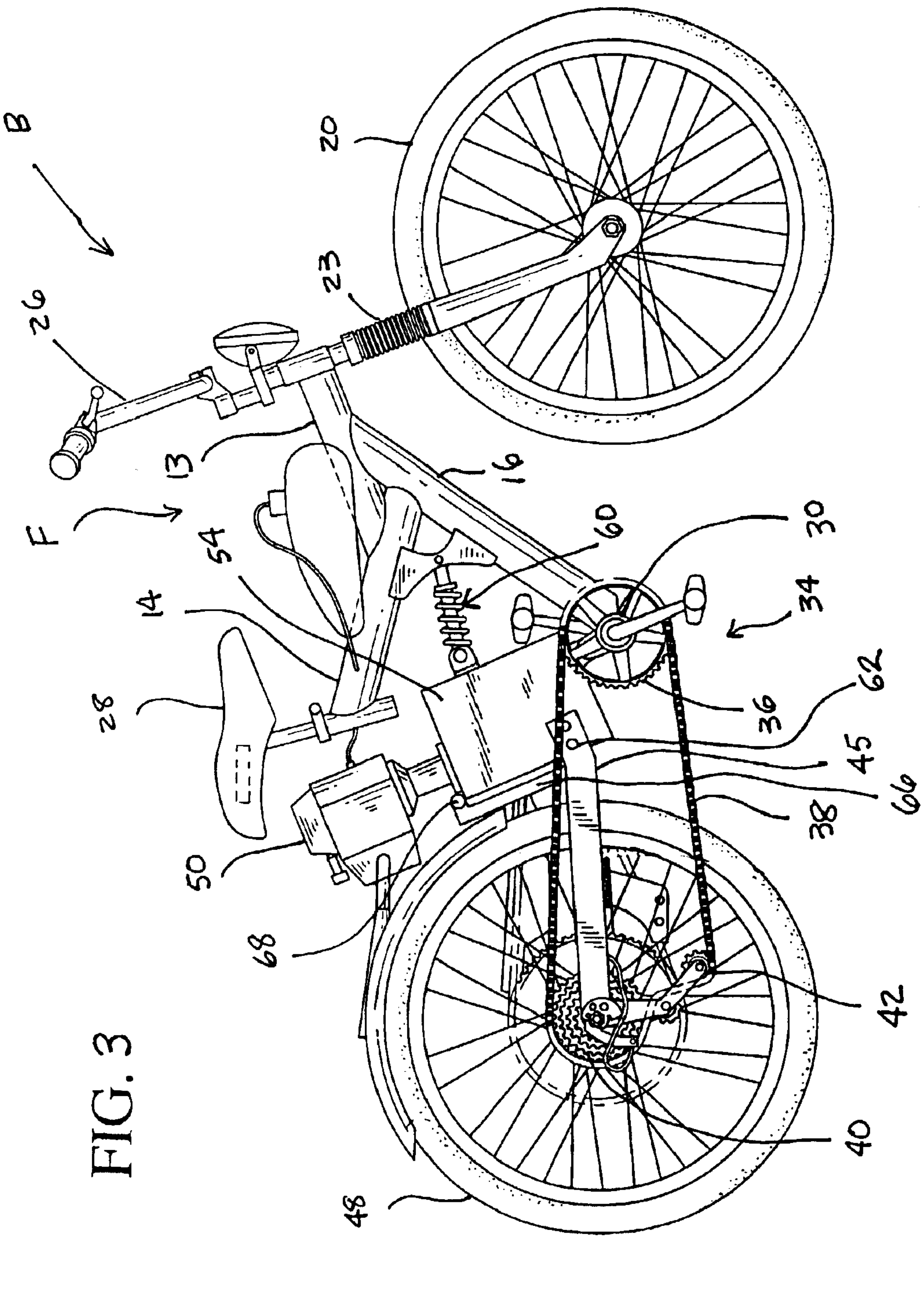
FIG. 3 is a left side elevational view of the vehicle shown in FIG. 1.

As best shown in FIGS. 1–3, the personal transport vehicle of the present invention is preferably in the form of a bicycle B, which includes a frame F, preferably suspended both in the front and the rear. (It is noted herewith that the frame F may be unsuspended in the front and/or rear.)

The frame F includes head tubes 10 at the upper forward portion of the frame, a seat tube 12 at the upper rearward portion of the frame, and front and rear crossbars or tubes 13 and 14, and a down tube 16 forming the middle portion of the frame. The head tubes 10 support the steering fork 18 on which the front wheel 20 is attached.

The front suspension is conventional with two down tubes 22 and 24 with associated internal springs and hydraulic dampening components 23. A conventional handlebar 26 is provided in the front of the frame F, and a seat 28 is adjustably supported by the seat tube 12. A bottom bracket 30 supports the pedals 32, and a conventional chain or manual drive assembly 34 is provided on the left side (right pedaling side) for pedal powering the bicycle B (FIG. 3). The chain drive assembly 34 includes a drive sprocket 36, a chain 38, an automatic freewheel sprocketed gear cluster 40, and a chain adjuster, tensioner, or deraileur 42. The drive assembly 34 can accommodate multiple drive sprockets in the front and/or rear, for allowing several speeds, such as one to twenty-one.

The rear suspension is formed by a power drive assembly 44, and left and right swing arms 45 and 46 for supporting a rear wheel 48 (FIGS. 1 and 3).

Figure 13:
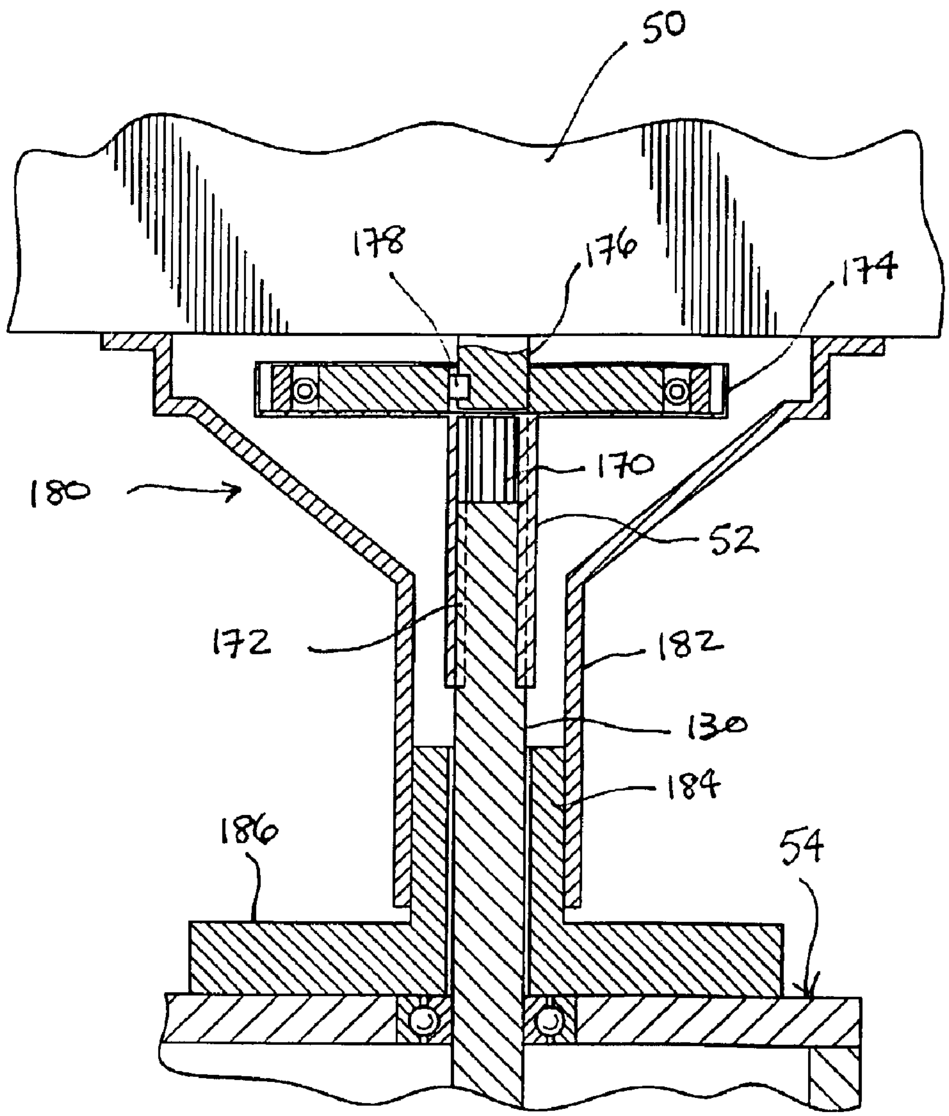
FIG. 13 is a vertical cross-sectional view showing the motor mounted on the transaxle unit.

The power drive assembly 44 includes a motor 50, which is inverted and mounted longitudinally of the frame F in a manner that its output shaft or axle 52 extends downwardly into a transaxle unit 54 (FIGS. 2 and 13). The motor 50 can be an electric, or two or four-stroke fuel-powered (gasoline, diesel, etc.) motor. The motor output shaft 52 preferably extends generally parallel to and rear of the seat tube 12 (FIG. 2).

The transaxle unit 54 is supported on the frame F by a bracket 56 and is pivotable front-to-rear in a vertical plane about a cross-pin 58 (see arrows X in FIG. 2). The transaxle unit 54 is further attached to the frame F between crossbar 14 and the down tube 16 by a spring-loaded shock assembly 60.

As best shown in FIGS. 1 and 3, the swing arms 45 and 46 are fixedly mounted on each side of the transaxle unit 54 by conventional fasteners 62, and are mounted to the rear wheel hub assembly 64. In FIGS. 2–3, reference numeral 66 designates a support bracket mounted to the rear of the transaxle unit 54 at 68, and preferably welded to the swing arms 45 and 46 towards the bottom thereof. The bracket 66 further supports the transaxle unit 54 and helps to maintain a clearance between the transaxle unit 54 and the rear wheel 48.

Figure 4:
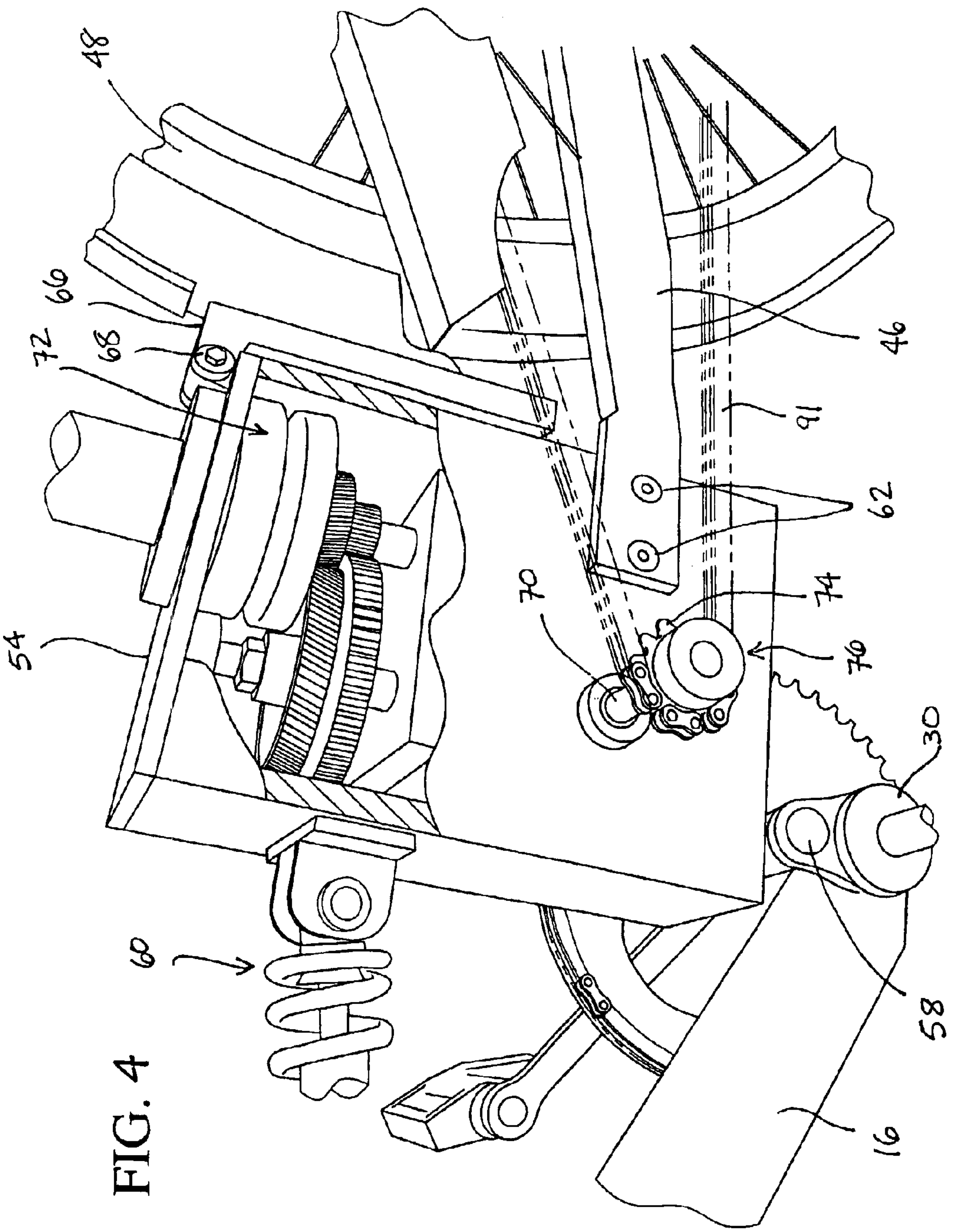
FIG. 4 is a fragmentary, enlarged view of the personal transport vehicle shown in FIG. 1, partially showing the internal components of the transmission.
Figure 5:
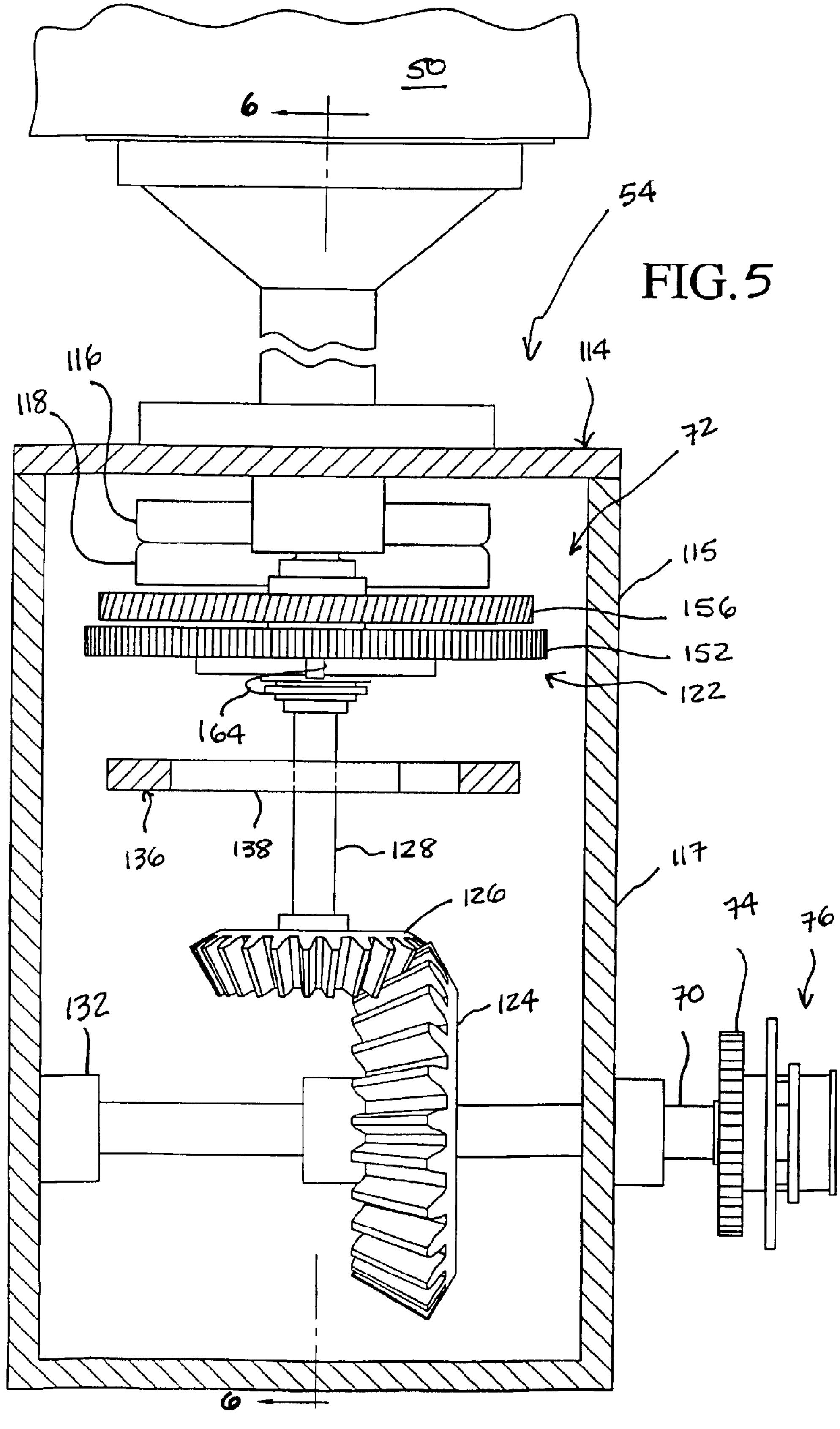
FIG. 5 is a front cross-sectional view of the transaxle unit of the present invention.
Figure 14:
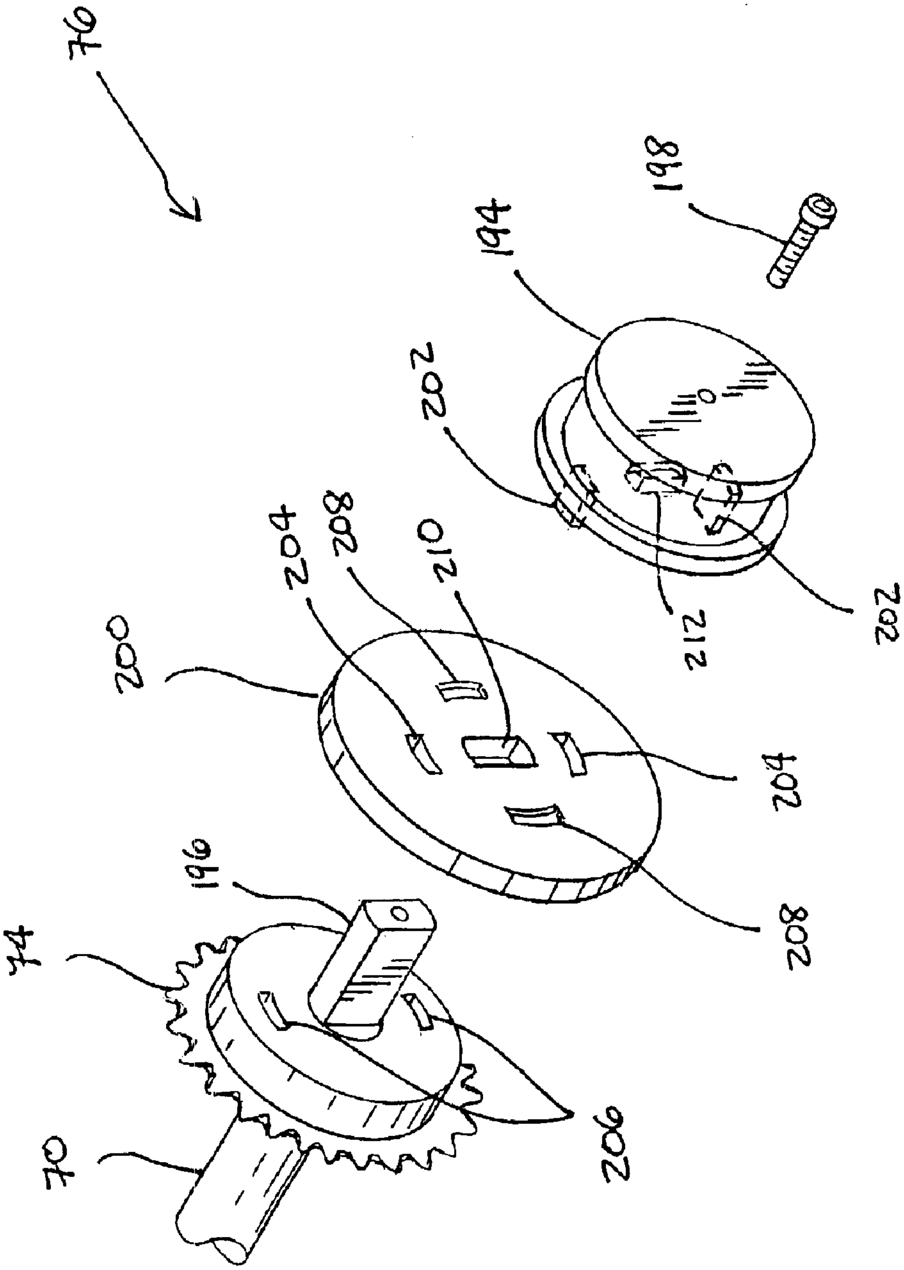
FIG. 14 is an exploded view showing the connect/disconnect mechanism for engaging/disengaging the chain drive sprocket from the transaxle output shaft.

As best shown in FIGS. 4–5, the transaxle unit 54 includes an output shaft 70 and a transmission 72. A drive sprocket 74 is mounted in a rotational relationship to the output shaft 70, and can be engaged or disengaged for rotation therewith by operating a connect/disconnect mechanism 76 (FIG. 14—described below in more detail).

Figure 10:
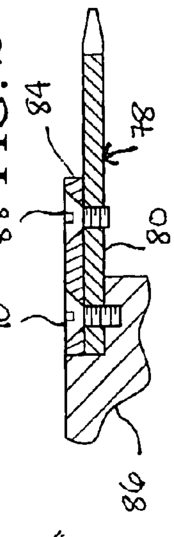
FIG. 10 is a cross-sectional view taken along line 10—10 of FIG. 9.
Figure 9:
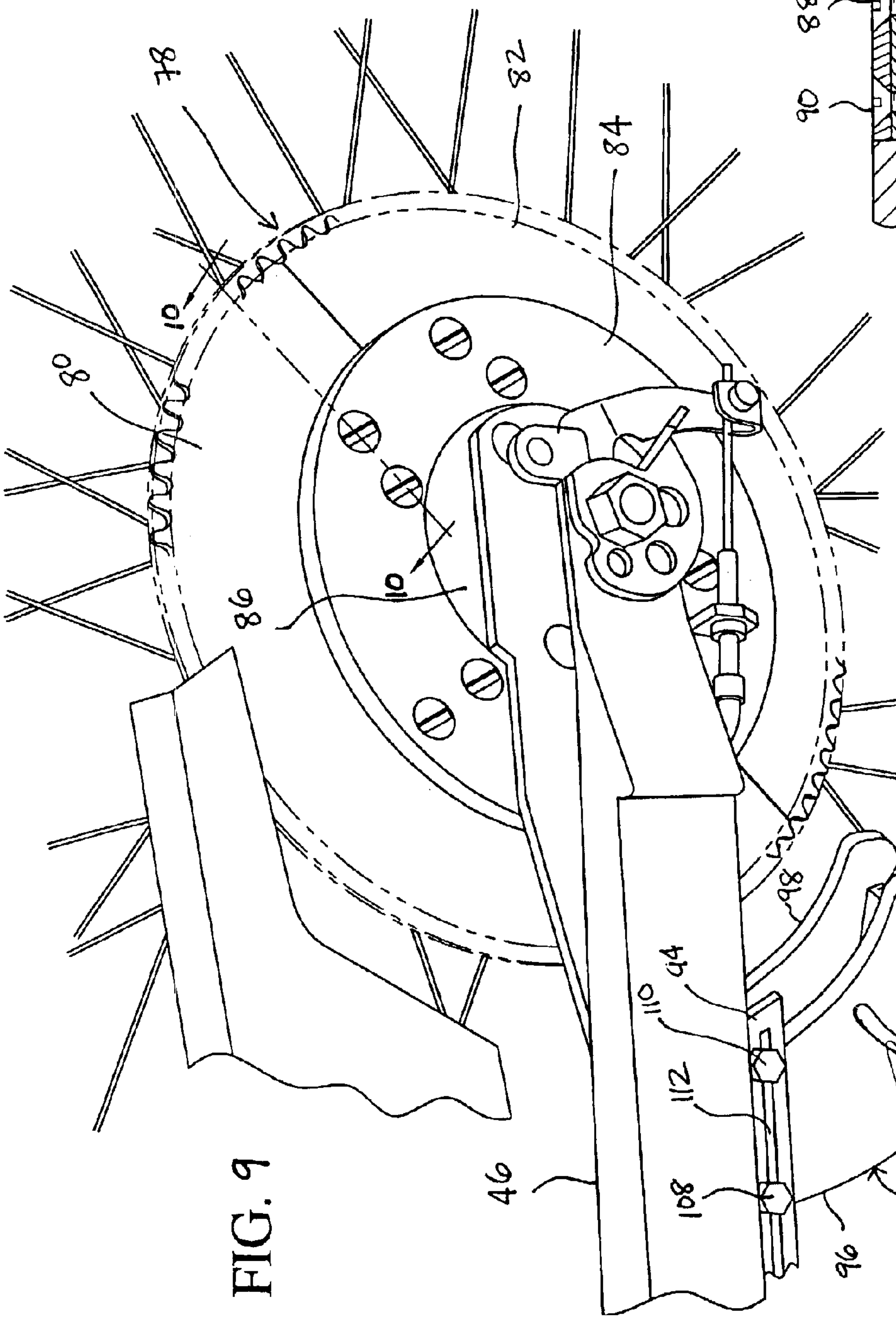
FIG. 9 is a fragmentary, enlarged view of the personal transport vehicle of the invention, showing the split-sprocket and the chain guide of the present invention.
Figure 11:
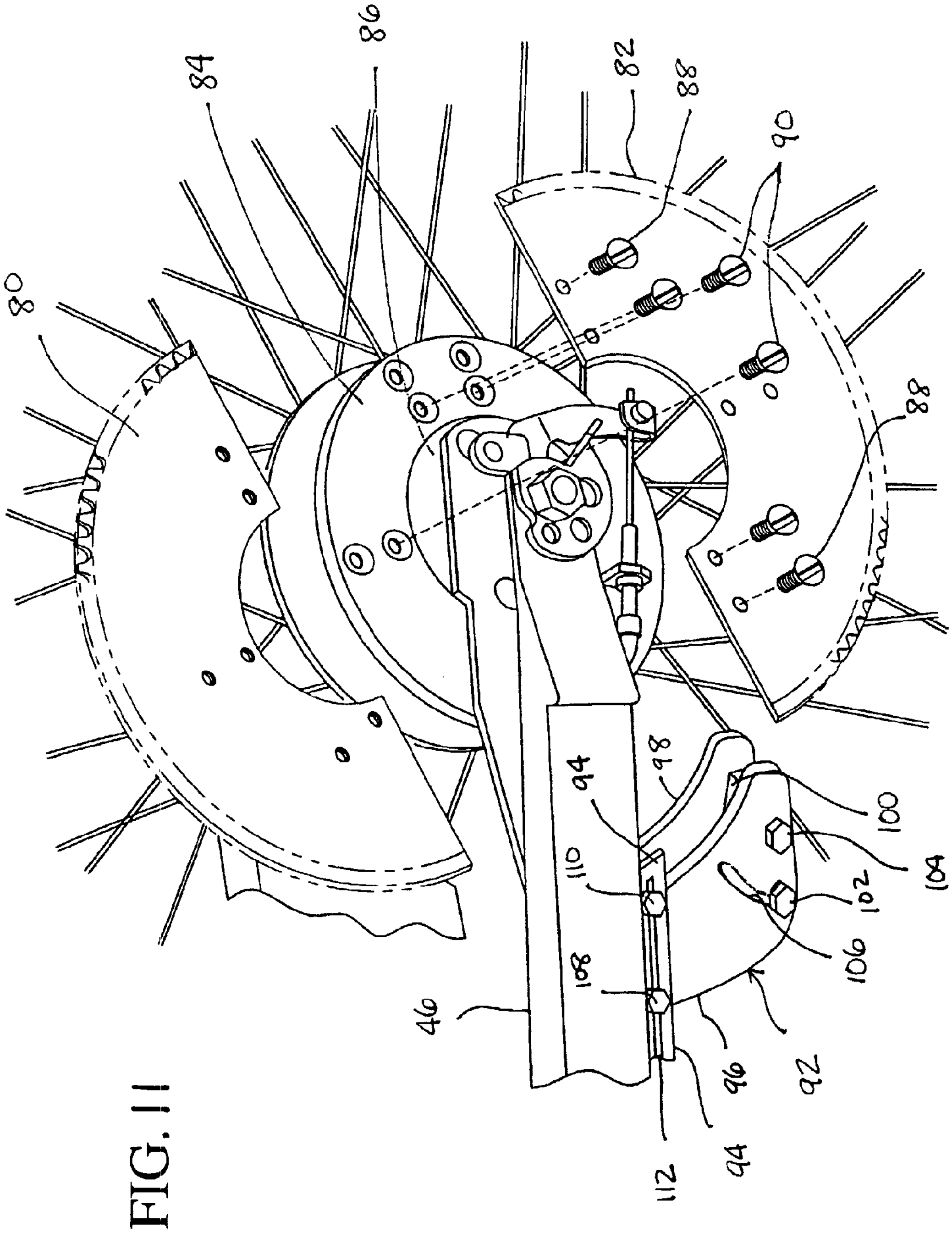
FIG. 11 is an exploded view showing the mounting details of the split-sprocket shown in FIG. 9.

As best shown in FIGS. 2 and 9–11, a driven non-freewheel split-sprocket 78 is positioned on the power drive assembly side (right side) of the bicycle B. In particular, the sprocket 78 is formed of two generally semicircular sections 80 and 82 that are mounted on a support plate 84. Both the sprocket 78 and the support plate 84 are mounted on a rear wheel hub 86. As best shown in FIG. 10, screw-fasteners 88 mechanically join together the sprocket 78 and the support plate 84, while screw-fasteners 90 join together the sprocket 78, the support plate 84, and the hub 86. A conventional chain 91 spans between the drive sprocket 74 and the driven sprocket 78 (FIG. 4). Preferably, the distance between the sprockets 74 and 78 is kept substantially constant.

Figure 17:
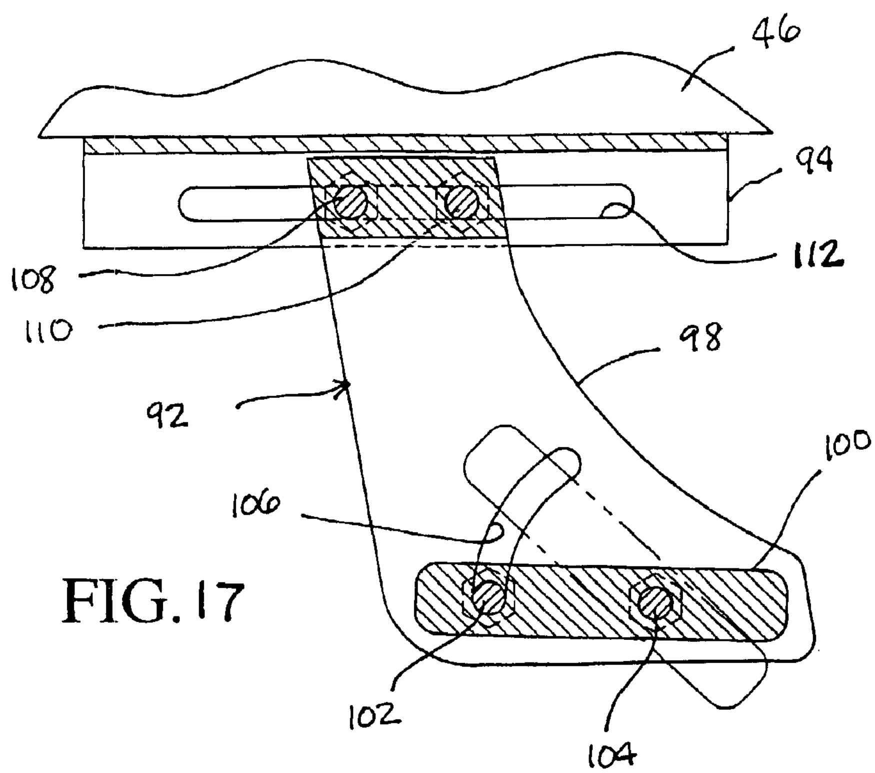
FIG. 17 is a vertical cross-sectional view of the chain guide of the invention.

As best shown in FIGS. 2, 9, 11 and 17, a chain guide 92 is mounted to the right swing arm 46 by a bracket 94. The chain guide 92 includes two laterally disposed generally L-shaped plates 96 and 98 for supporting therebetween a guide ramp 100. As best shown in FIG. 17, the angle of the guide ramp 100, relative to the swing arm 46, can be varied by loosening front and rear fasteners 102 and 104, and pivoting the ramp 100 about the rear fastener 104, such that the front fastener 102 travels along curved slots 106 in the plates 96 and 98.

The overall anchoring position of the chain guide 92, relative to the swing arm 46, may also be varied or adjusted by loosening front and rear fasteners 108 and 110, and sliding the chain guide 92 front-rear in the bracket slot 112. Preferably, the ramp 100 is pivotable from about 0° to 30° relative to the swing arm 46. This allows sprocket (78) diameter changes while maintaining proper chain tracking and tension.

Figure 6:
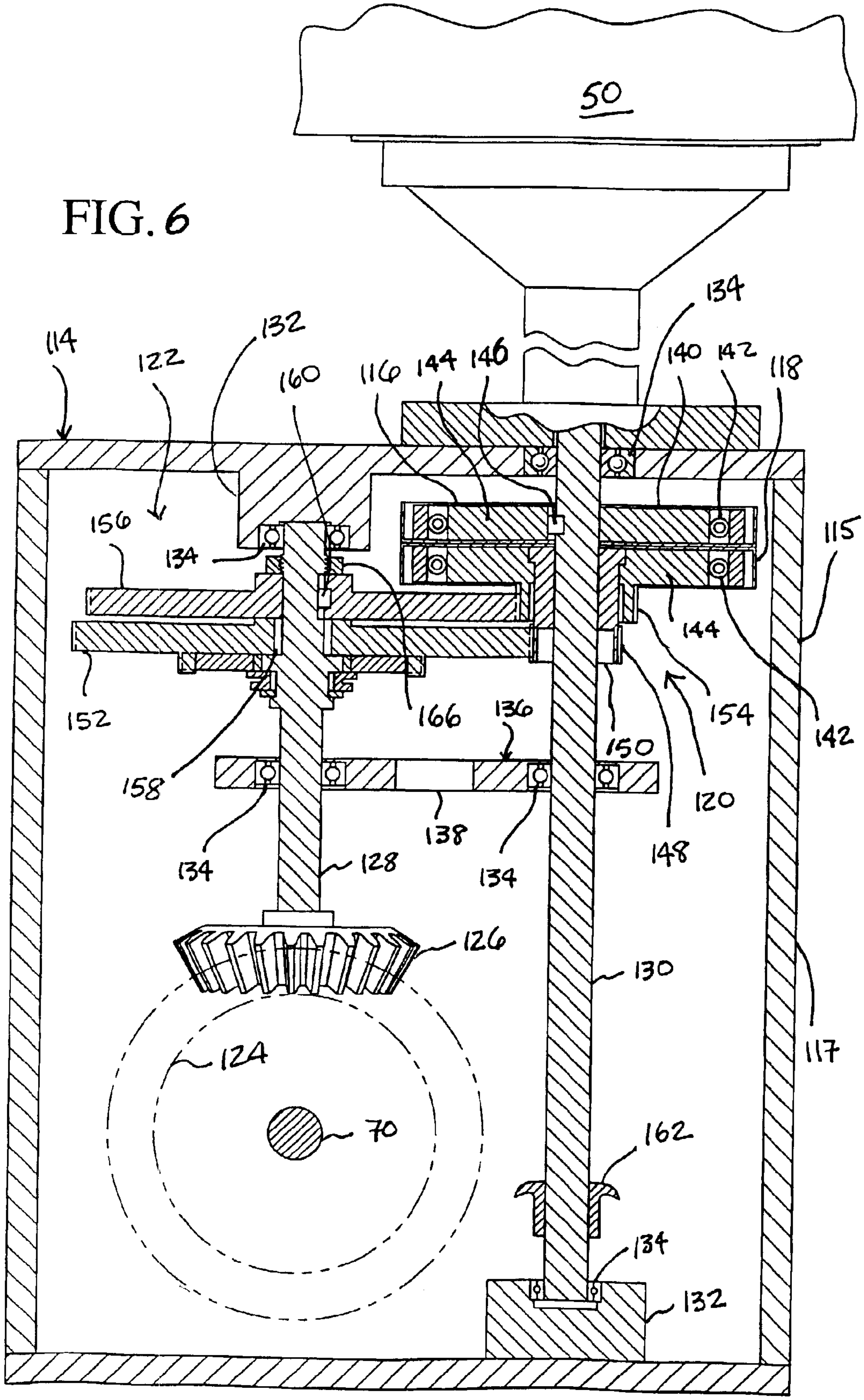
FIG. 6 is a cross-sectional view taken along line 6—6 of FIG. 5.

Referring now to FIGS. 5–6, the transaxle unit 54 includes a gearbox or casing 114 for housing various components of the transmission 72. In particular, the transmission 72, preferably includes two conventional upper and lower, wet centrifugal clutches 116 and 118, a drive gear cluster 120, and a driven gear cluster 122, in the upper chamber 115 of the gearbox 114. The output from the driven gear cluster 122 is transmitted to a right angle ring gear 124 via a pinion gear 126 connected by a drive shaft 128, located in the lower chamber 117 of the gearbox 114. The ring gear 124 is, in turn, mounted on the output shaft 70. Preferably, the output shaft 70 extends substantially in the same horizontal plane as the rear wheel hub 86 (FIG. 2).

An input shaft 130 extends from the motor 50 for turning the drive gear cluster 120, as discussed below in more detail. A plate 136 separates the gear clusters 120 and 122 from the output gears 124 and 126 and to provide general overall support to the transmission components. A recess 138 in the plate 136 allows the flow of fluid between the upper and lower chambers 115 and 117 of the gearbox 114.

Referring to FIG. 6, each of the low (upper) and high (lower) speed clutches 116 and 118, respectively, includes a spring 142 and a clutch plate 144. Both clutches 116 and 118 are mounted in the same housing 140.

Figure 28:
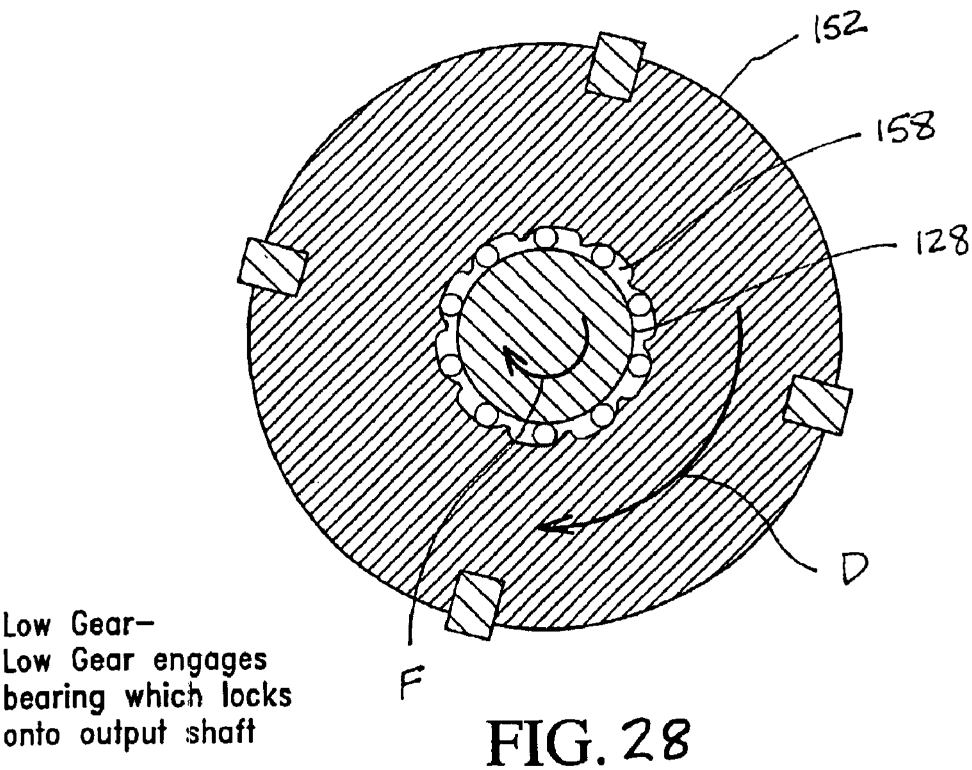
FIGS. 28–29 illustrate engagement and idle positions of the low driven gear, respectively, to the transaxle output shaft.
Figure 29:
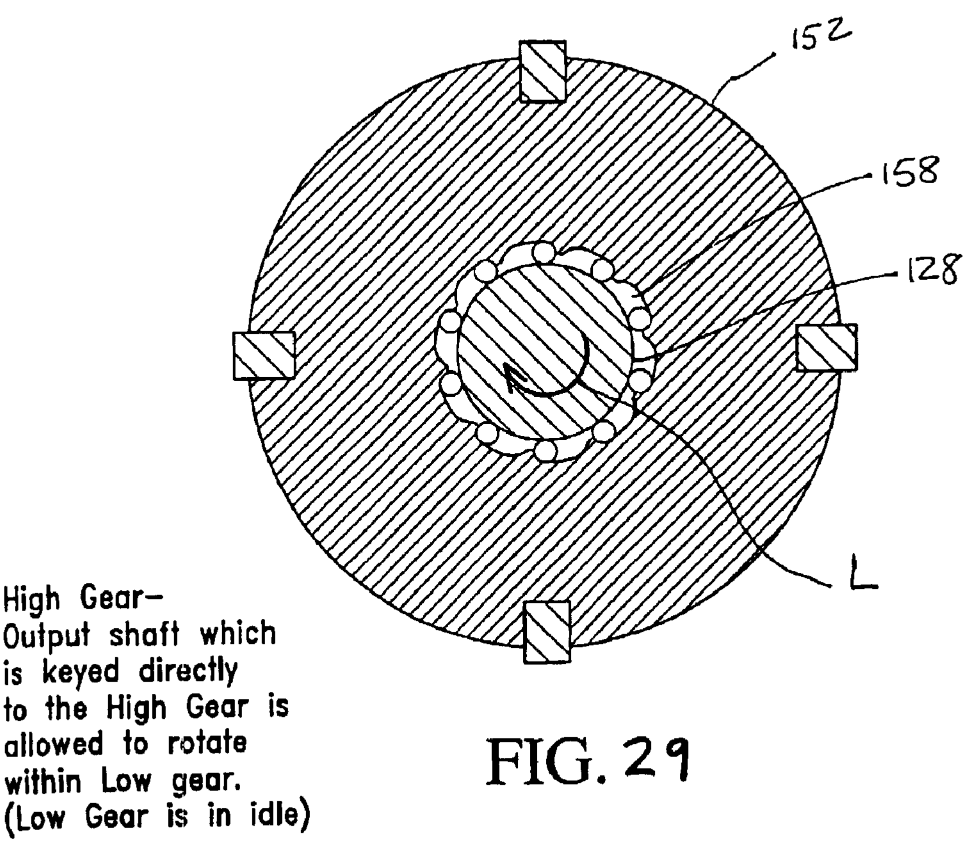

The upper, low-speed clutch 116 is directly connected to the input shaft 130 by a key 146. The clutch housing 140 is directly connected to the lower, low-speed drive gear 148 via a sleeve bearing 150. The low-speed drive gear 148, on the other hand, meshes with the lower, low-speed driven gear 152. The upper, high speed drive gear 154 is mounted directly to the high-speed clutch 118, and meshes with upper, high-speed driven gear 156. The lower, low-speed driven gear 152 is mounted on the drive shaft 128 by a one-way bearing 158, such that the engagement takes place in the direction of a desired rotation only (FIG. 28), and it is allowed to idle or freewheel when a high speed engagement is achieved (FIG. 29). The upper, high-speed driven gear 156 is directly connected to the drive shaft 128 by a key 160.

In FIG. 6, reference numeral 134 designates conventional bearings, and reference numeral 132 designates conventional spacers. Further, reference numeral 162 designates an oil sling for lubrication, and reference numeral 166 designates a lock nut. In FIG. 5, reference numeral 164 designates a spring clip for the one way bearing 158.

Figure 7:
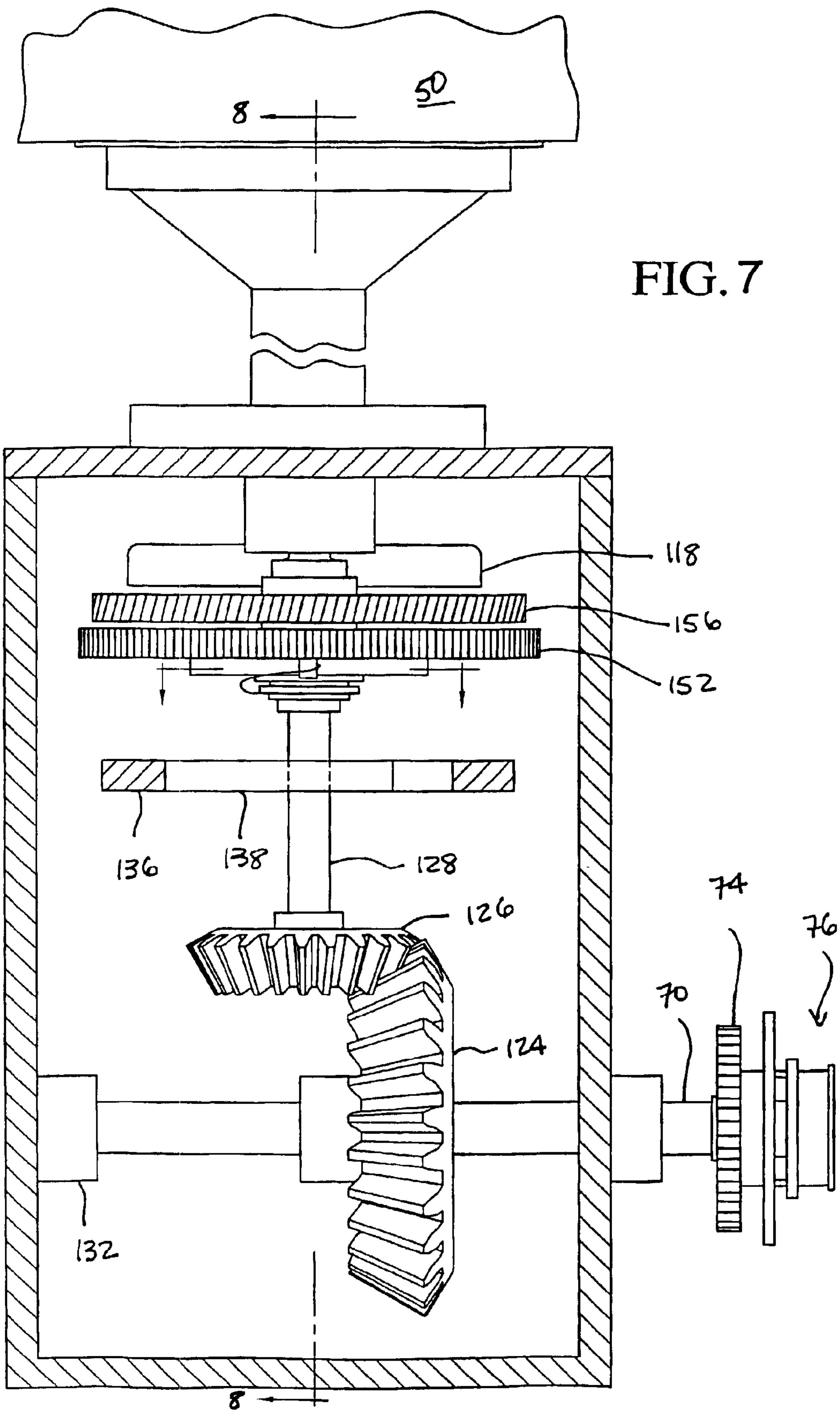
FIG. 7 is a view similar to FIG. 5, showing a one-clutch embodiment of the transmission.
Figure 8:
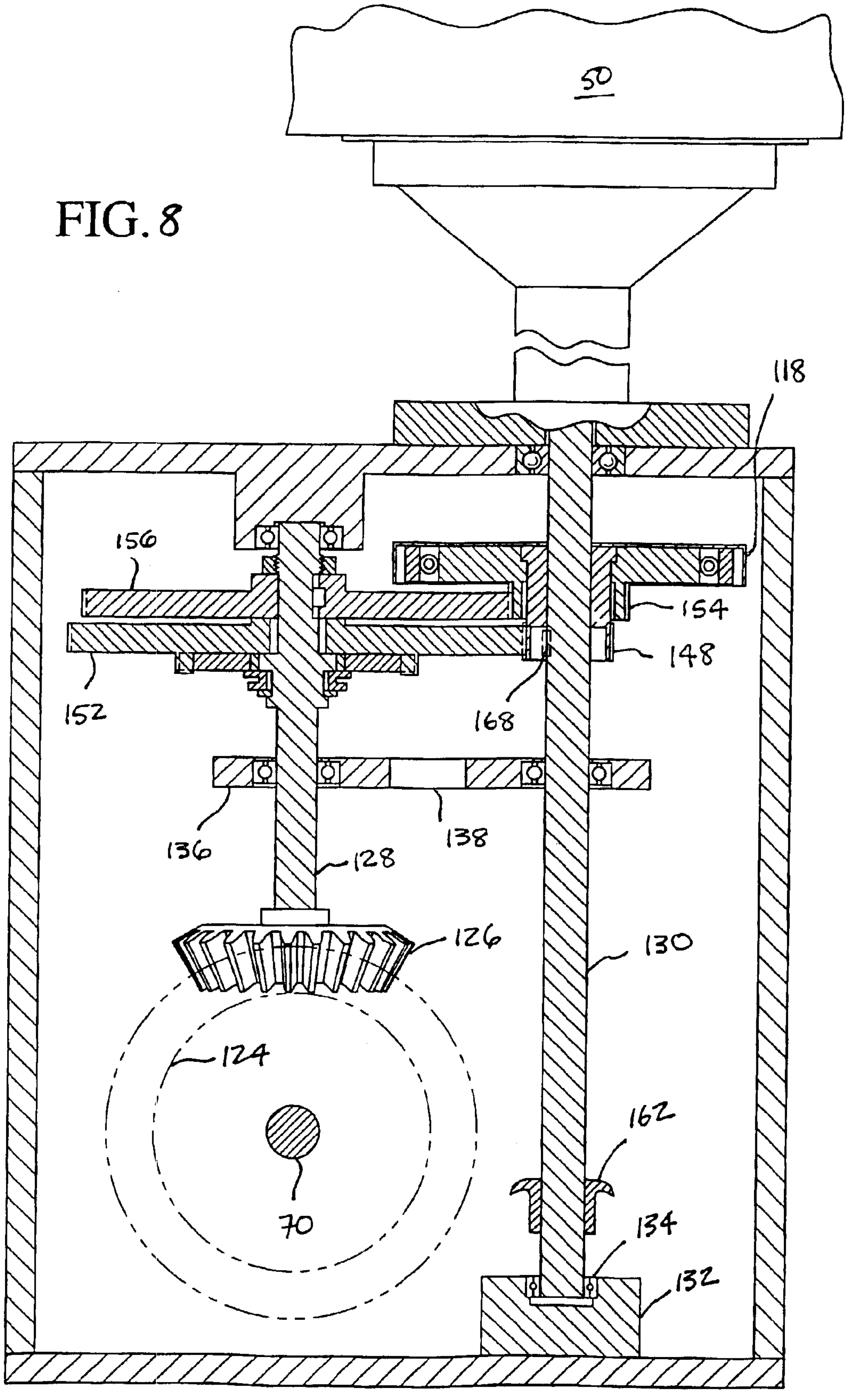
FIG. 8 is a cross-sectional view taken along line 8—8 of FIG. 7.

FIGS. 7–8 illustrate another embodiment of the transmission, which is similar to the transmission disclosed in FIGS. 6–7, with the exception that only a high speed clutch 118 is used and the lower, low-speed drive gear 148 is directly connected to the input shaft 130 by a key 168. The remaining components and the operation remain substantially the same. In particular, a rotation of the input shaft 130 causes a rotation of the low-speed drive and driven gears 148 and 152, respectively. The rotation of the driven gear 152 causes the drive shaft 128 to rotate which, in turn, rotates the high speed driven gear 156, thereby transferring rotation to the upper, high-speed drive gear 154 connected directly to the clutch 118. As the motor rpm increases, the clutch 118 opens due to the centrifugal force and rotates the driven gear 156 at a high speed. This results in a high speed rotation of the drive shaft 128, which powers the output shaft 70.

Figure 12:
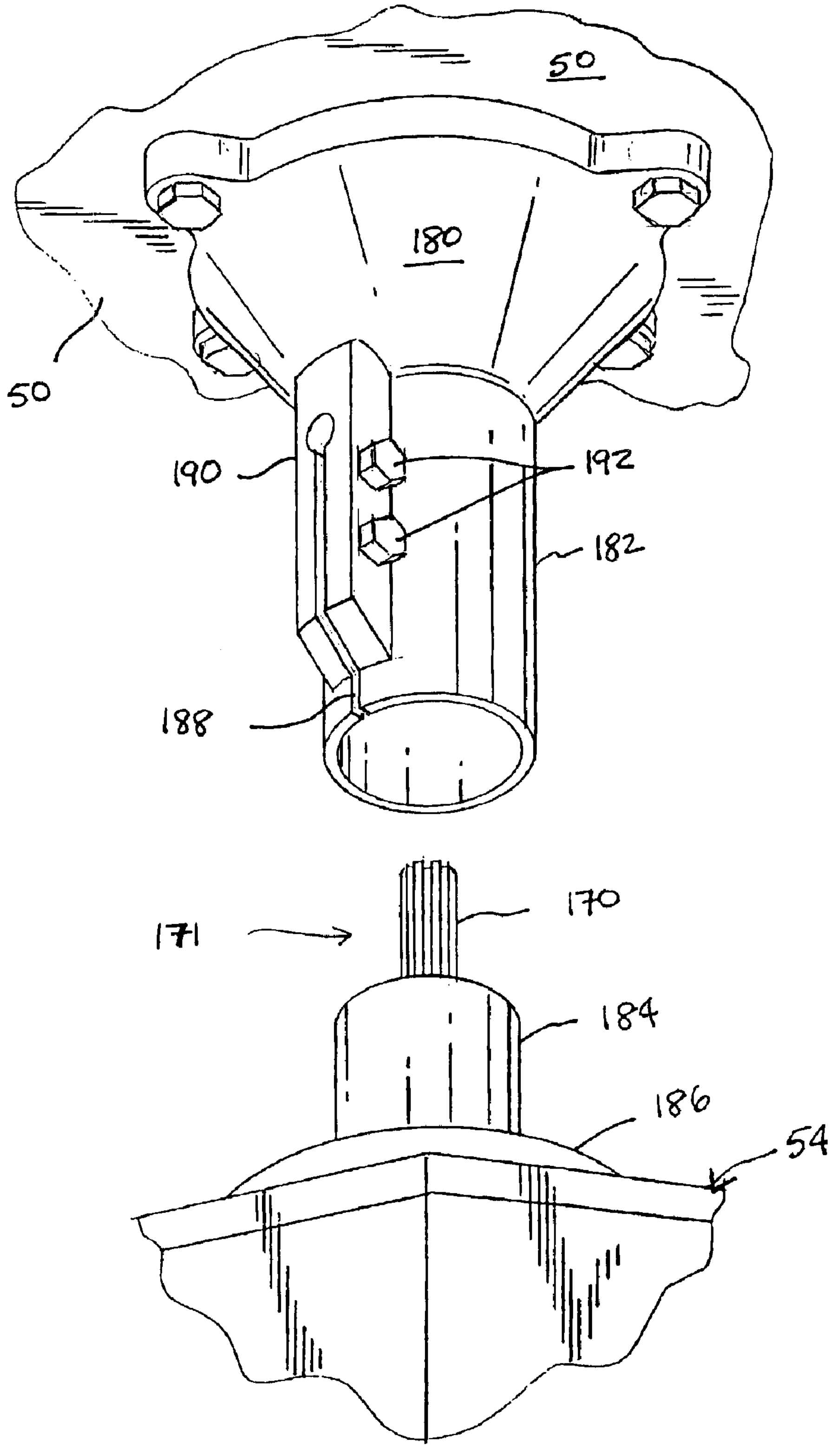
FIG. 12 illustrates mounting and connection of the motor to the transaxle unit.

Referring to FIGS. 12–13, the mounting details for the motor 50 on the transaxle unit 54 will now be described. As shown, the input shaft 130 includes external splines 170 at its upper end 171 that intermesh with the corresponding internal splines 172 on the internal periphery of the motor output sleeve shaft 52. The motor output shaft 52 is connected to a conventional dry centrifugal clutch 174, which is directly connected to the motor drive axle 176 by a key 178.

A yoke 180 extends from the motor 50 and includes a sleeve portion 182 that slidably fits over the mounting sleeve portion 184 of a support flange 186 provided on the transaxle unit 54. As best shown in FIG. 12, the sleeve 182 is longitudinally split at 188 and includes an integral split-clamp 190 with preferably two screw-threaded fasteners 192. One of ordinary skill in the art would appreciate that by actuating the fasteners 192, the sleeve 182 can be easily tightened over, or released from the sleeve 184.

Figure 15:
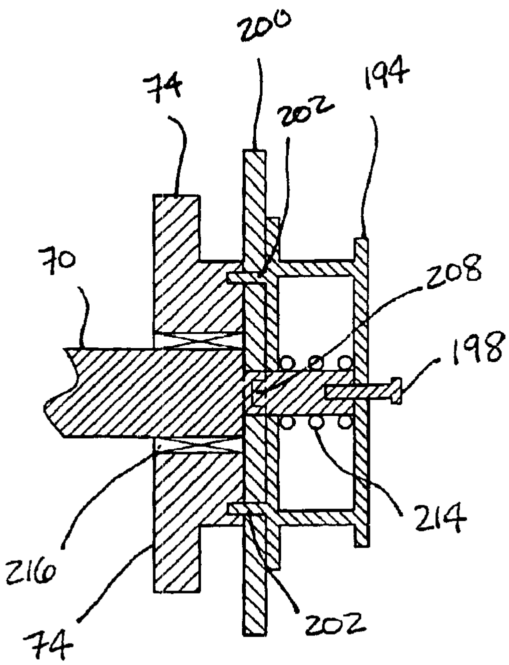
FIG. 15 is a cross-sectional view of the connect/disconnect mechanism, showing the chain drive sprocket in an engaged position to rotate with the transaxle output shaft.
Figure 16:
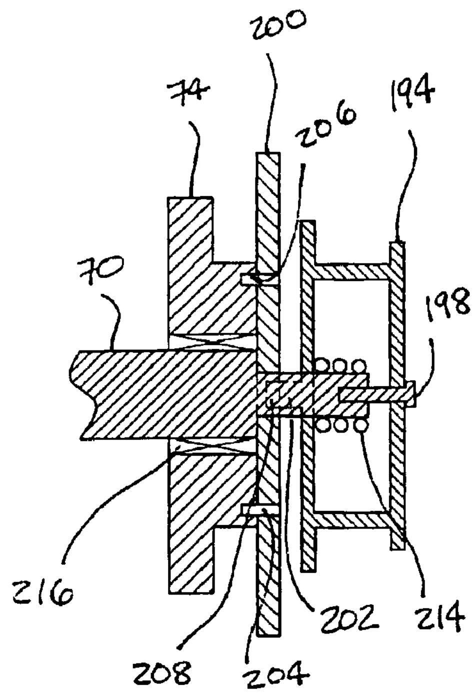
FIG. 16 is a view similar to FIG. 15, showing the chain drive sprocket in a disengaged position.

FIGS. 14–16 illustrate an embodiment of the connect/disconnect mechanism 76 for rotationally engaging the drive sprocket 74 with the output shaft 70. As best shown in FIG. 14, the connect/disconnect mechanism 76 includes a manually actuable locking knob 194 mechanically fastened to a tapped end 196 of the output shaft 70 by a screw-fastener 198. A plate 200 is positioned between the knob 194 and the sprocket 74. The locking knob 194 includes, preferably two diametrically opposed male members 202 that extend through corresponding through-holes 204 in the plate 200, to be received in two corresponding recesses 206 in the sprocket 74. The plate 200 also includes two holes 208 that partially extend through the thickness thereof. Preferably, partial-holes 208 are alternately disposed with the through-holes 204 at a right angle to each other in a circular pattern. The tapped end 196 of the output shaft 70 extends through a central through-hole 210 of the plate 200 to be received in a recess 212 in the knob 194. As best shown in FIGS. 15–16, the locking knob 194 is internally biased with a spring 214 to engage directly with the output shaft 70.

Referring now to FIGS. 15–16, it is noted that the drive sprocket 74 is mounted on a bearing 216 to spin freely on the drive shaft 70. As shown in FIG. 14, the recesses 206 in the sprocket 74 and the through holes 204 in the plate 200, are in general axial alignment with the male members 202 of the locking knob 194. Therefore, as shown in FIG. 15, when the male members 202 extend through the holes 204 in the plate 200 and are received in corresponding recesses 206, the drive sprocket 74 is in the locked or engaged position with the output shaft 70. In this position, the sprocket 74 will rotate with the output shaft 70.

In order to disengage or disconnect the sprocket 74 from the output shaft 70, one merely need to pull out (to the right in FIG. 15) the locking knob 194, until the male members 202 are completely out of the through holes 204 in the plate 200, rotate the knob 194 by 90° to align the male members 202 with the partial-holes 208 of the plate 200 (FIG. 16), and allow the male members 202 to be received in the partial holes 208 by letting the knob 194 snap left under the force of the spring 214 (FIG. 16). Since the male members 202 no longer engage the drive sprocket 74, the sprocket 74 would now be disconnected and be in disengagement from the output shaft 70. In the disengaged or disconnected position shown in FIG. 16, only the output shaft 70, plate 200, and the locking knob 194 would rotate. It is noted herewith that in order to prevent any unintentional rotation of the drive sprocket 74 in the disengaged position, a small clearance may be provided between the sprocket 74 and the plate 200.

Figure 19:
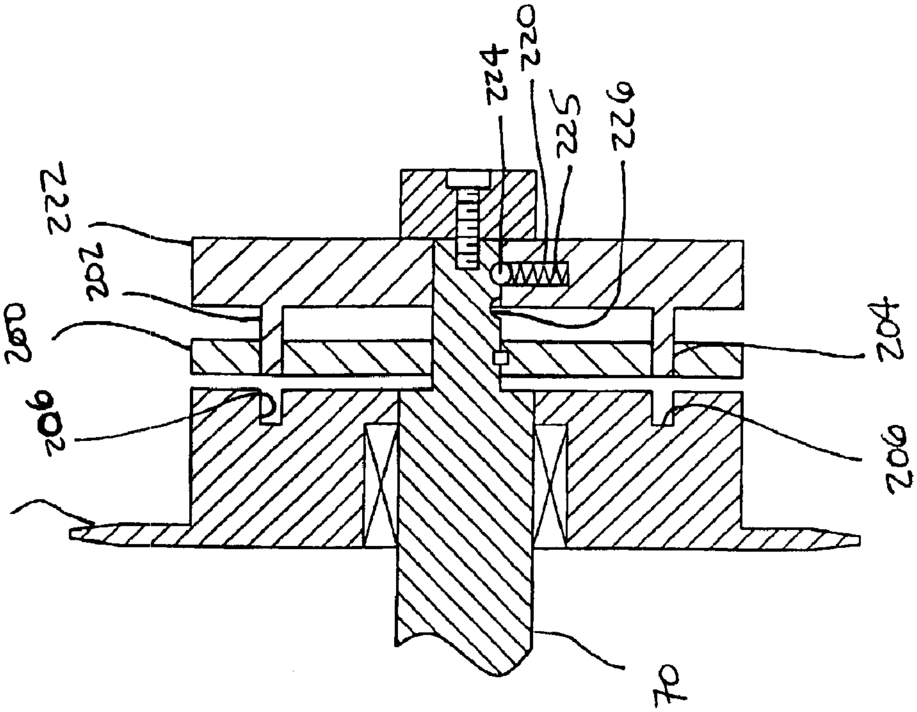
FIG. 19 is a view to similar to FIG. 18, showing the chain drive sprocket in a disengaged position.
Figure 18:
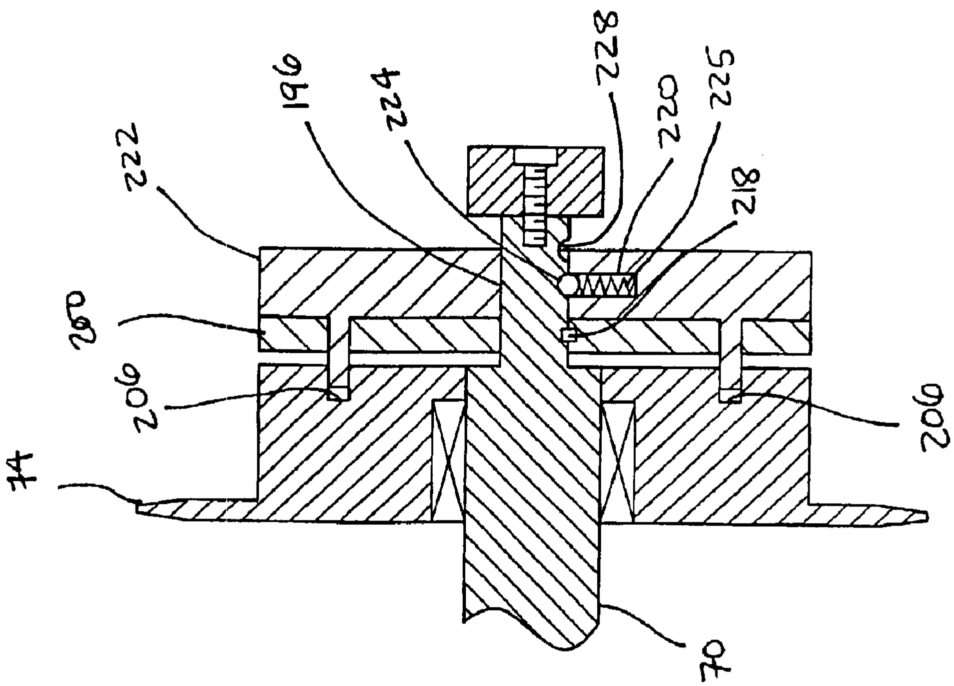
FIG. 18 is a vertical cross-sectional view of an alternative embodiment of the connect/disconnect mechanism, showing the chain drive sprocket in an engaged position.
Figure 20:
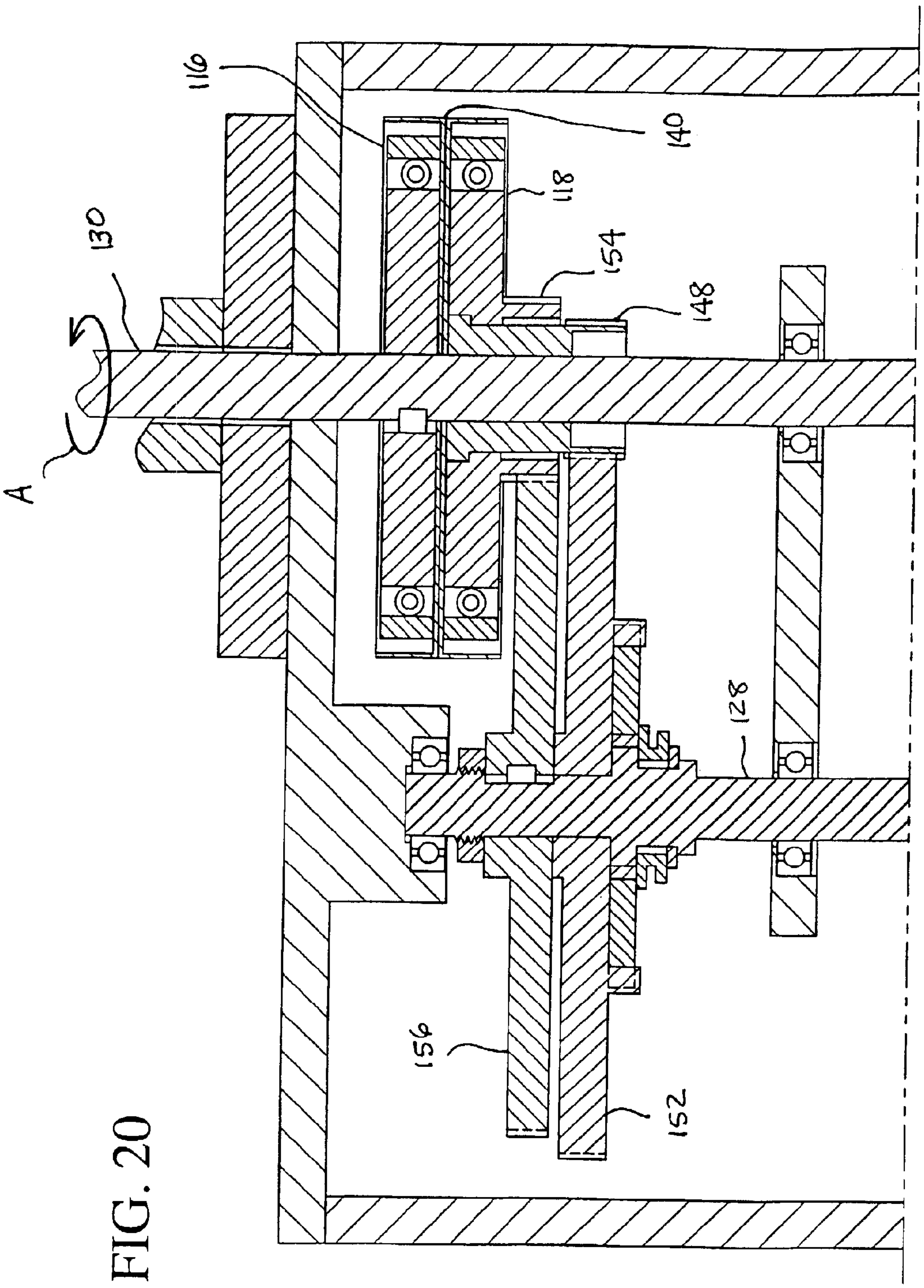
FIGS. 20–27 illustrate the sequence of turning the transmission in a power mode.
Figure 21:
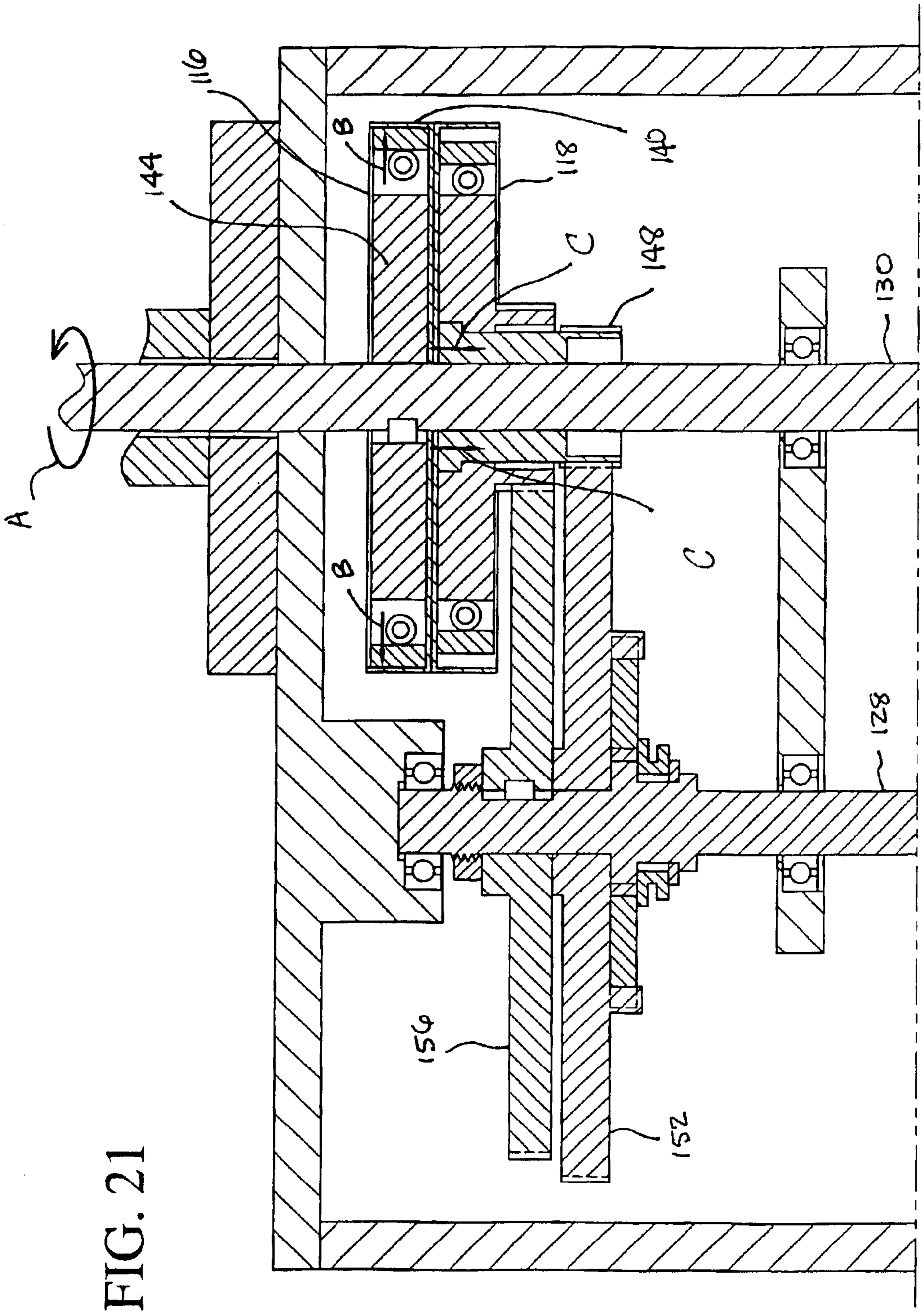
Figure 22:
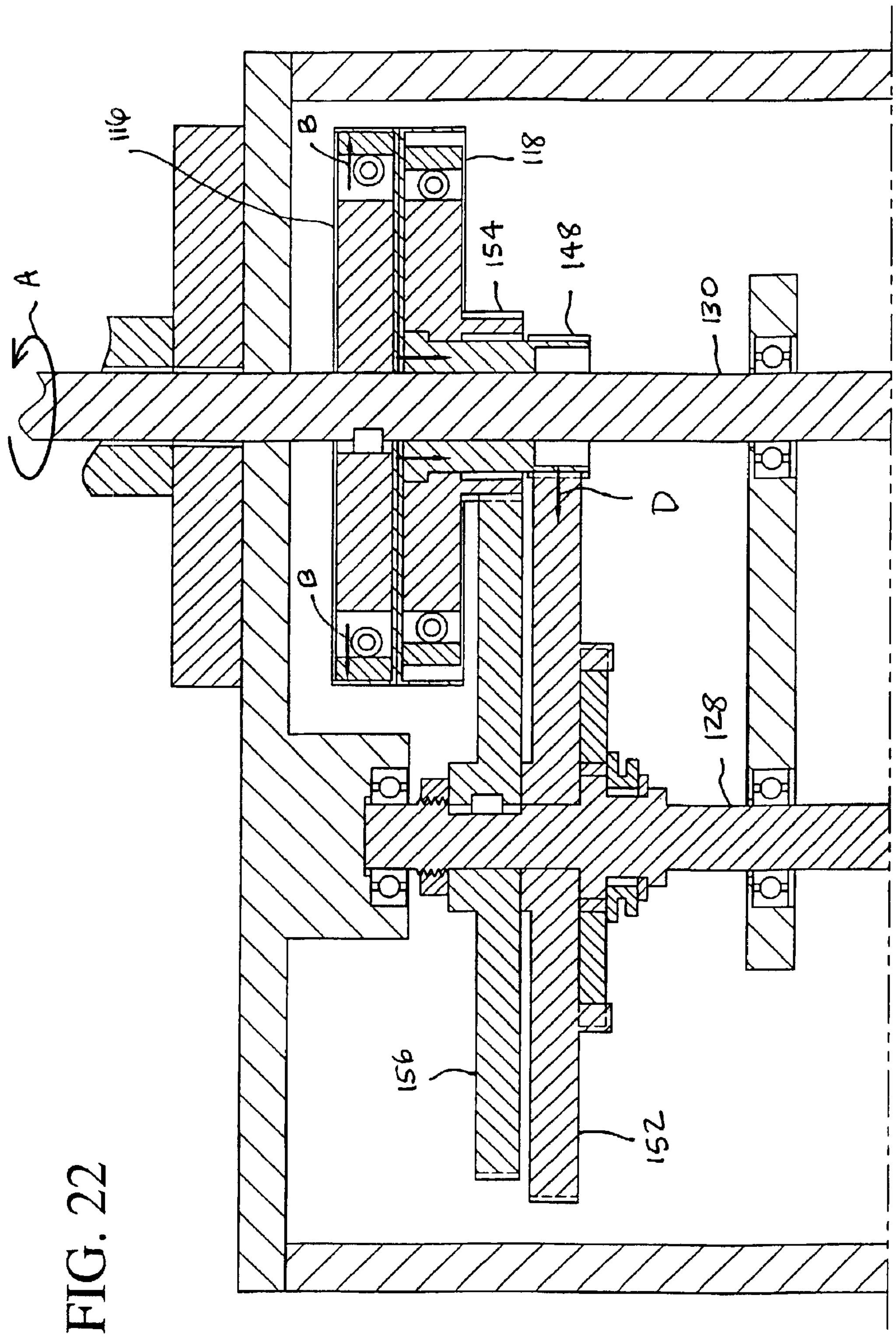
Figure 23:
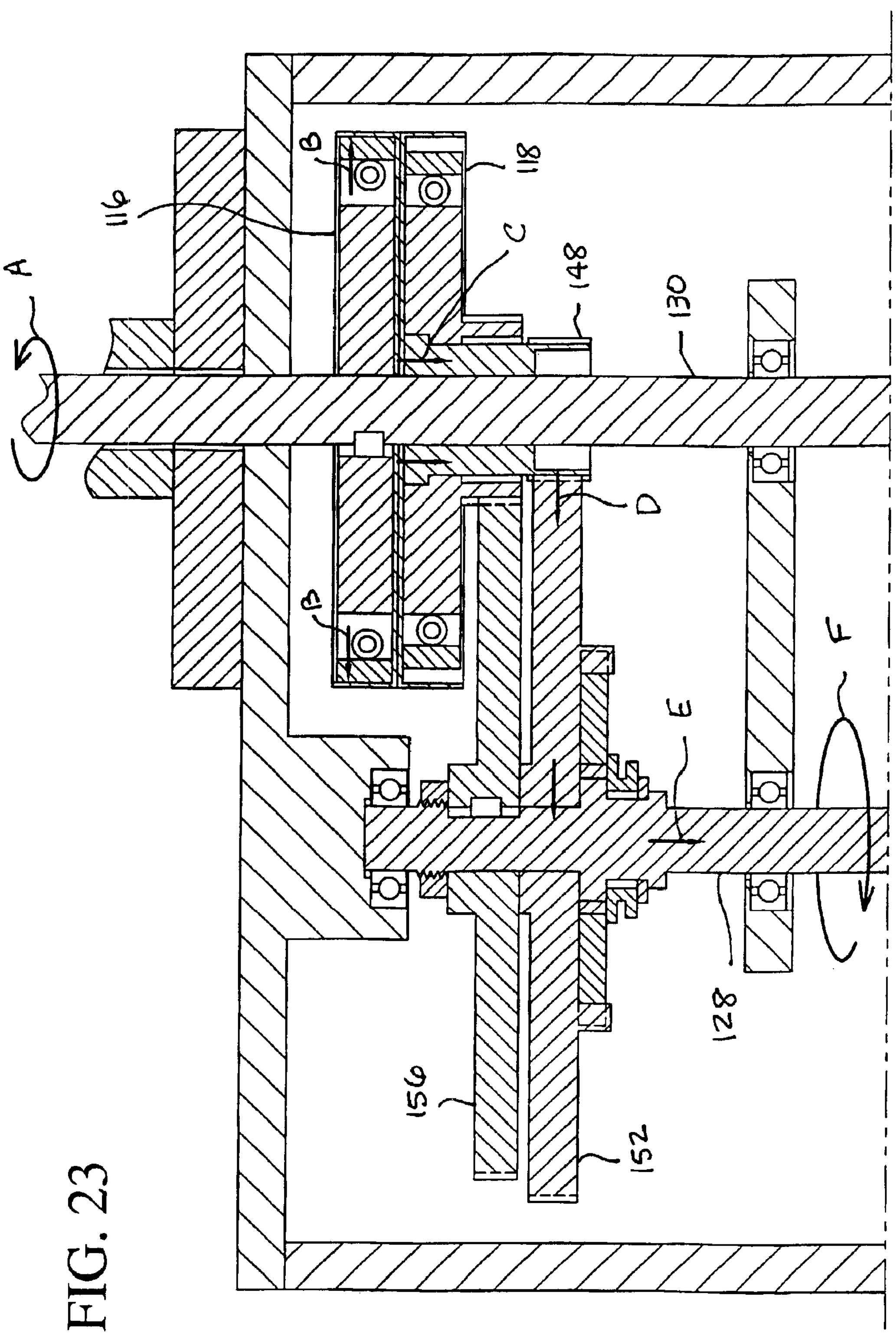
Figure 24:
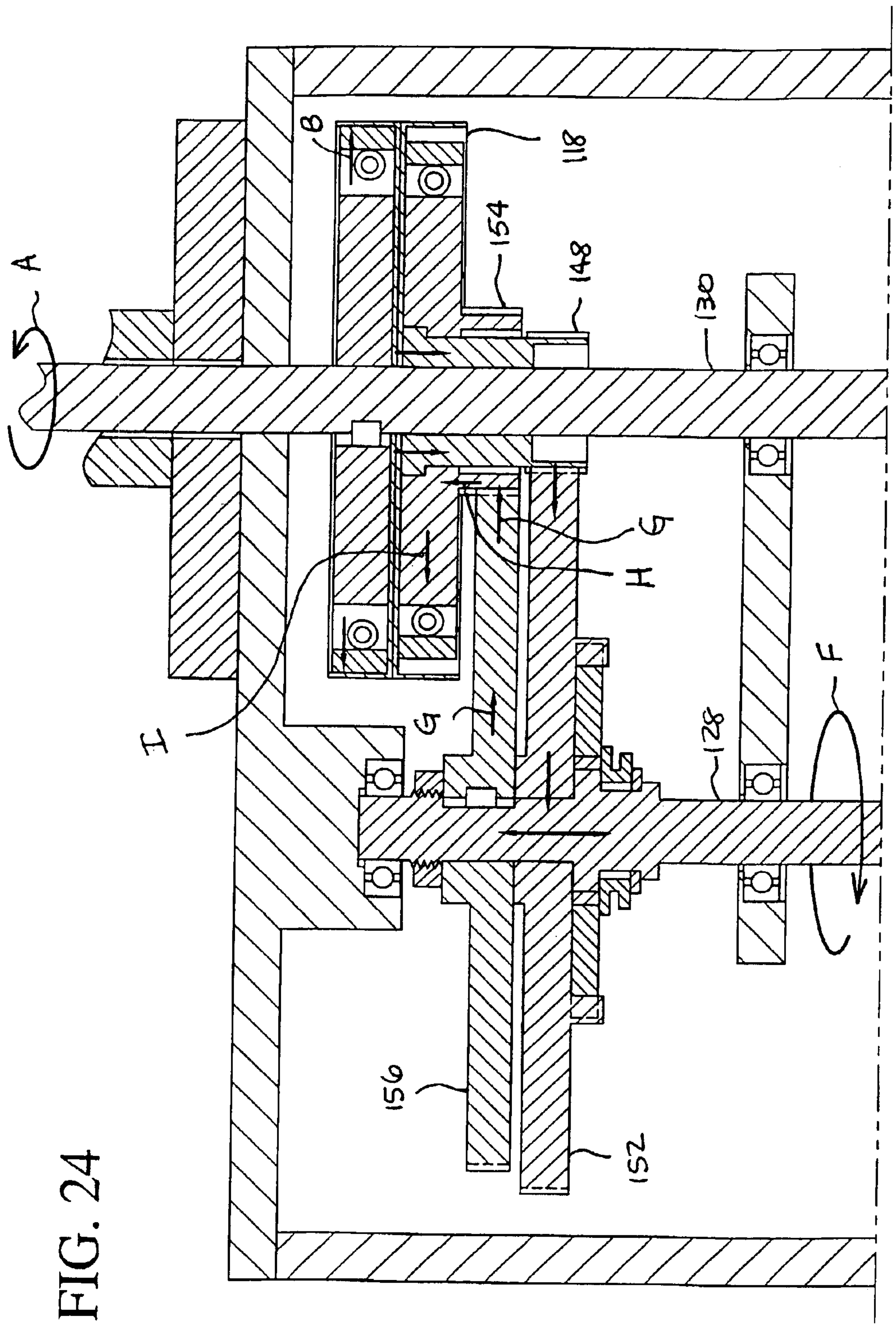
Figure 25:
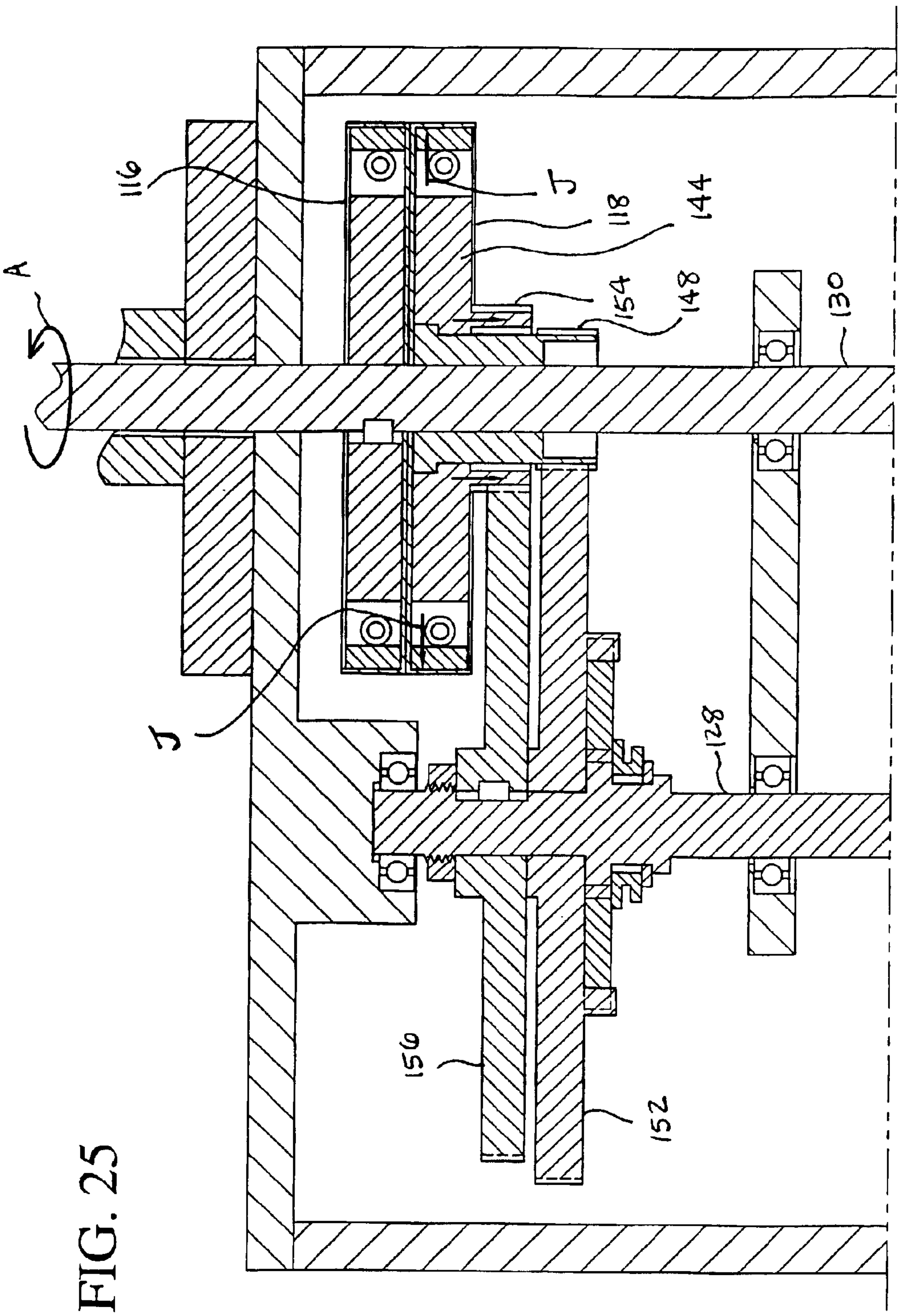
Figure 26:
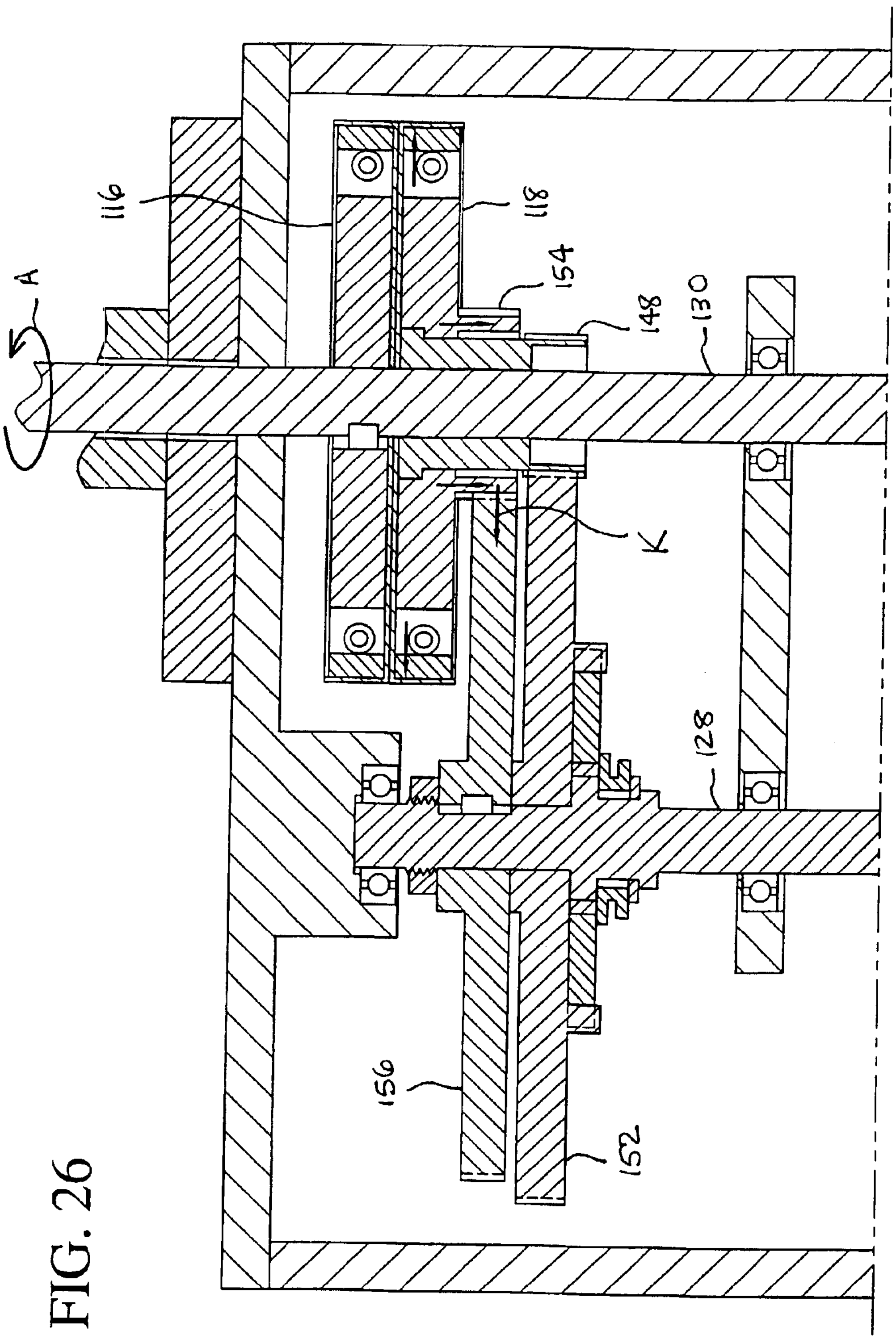
Figure 27:
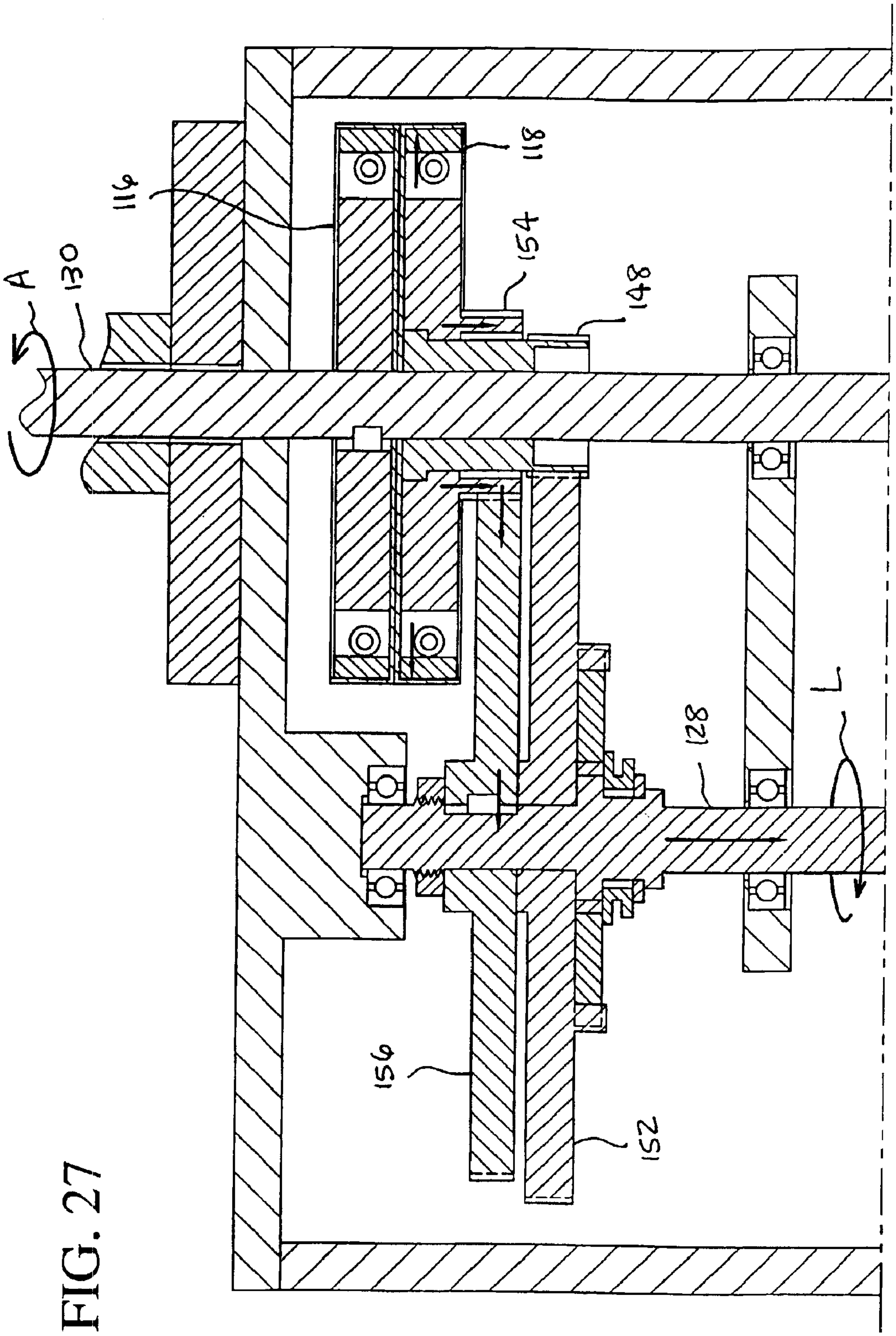

FIGS. 18–19 illustrate an alternative embodiment of the connect/disconnect mechanism for the drive sprocket 74 and the output drive shaft 70 (wherein the like parts have been designated with the same reference numerals as in the embodiment shown above in FIGS. 14–16) with the basic exception that the plate 200 is directly connected to the output shaft 70 by a key 218, and a spring-biased ball-lock mechanism 220 is provided in the locking knob 222.

In the engaged position shown in FIG. 18, the ball 224 of the lock mechanism 220 is snapped into a corresponding first recess 226 in the end 196 of the output shaft 70. In order to disengage, one need to merely pull out (to the right in FIG. 18) the knob 222, with a force sufficient to overcome the force of the spring 225, such that the ball 224 snaps out of the first recess 226 (FIG. 19) and snaps into a corresponding second recess 228 (FIG. 18) in the end 196 of the output shaft 70.

As in the previous embodiment shown in FIGS. 14–16, in the disengaged position shown in FIG. 19, the male members 202 on the knob 222 extend clear of the recesses 206 in the sprocket 74, and remain in the plate 200. In view of this arrangement, one of ordinary skill in the art would appreciate that since in this embodiment one need not rotate the knob 222 to lock or unlock, it would be unnecessary to provide partial holes 208 in the plate 200. In other words, the plate 200 would merely have two diametrically opposed through holes 204 for this embodiment.

Although not shown, a linkage mechanism may be provided to actuate the connect/disconnect mechanism 76 directly from the handlebar 26.

Figure 30:
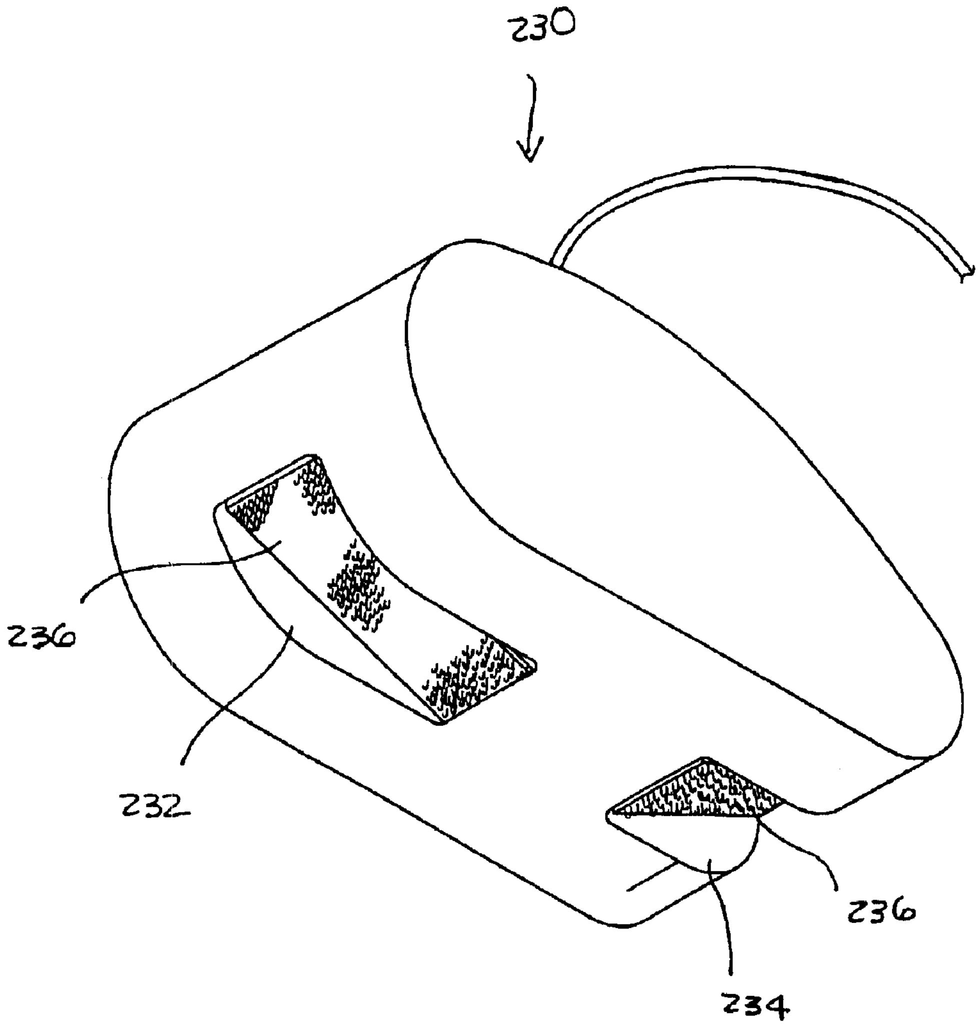
FIG. 30 is a bottom perspective view of the removable fuel tank of the invention.

FIG. 30 illustrates a removable fuel tank 230 for use in the vehicle of the invention. As best shown in FIGS. 2 and 30, the fuel tank 230 includes, on its underside, a front downwardly inclined recess 232, which has the general overall configuration to fit over the front crossbar 13. Likewise, an upwardly inclined recess 234, having the general overall configuration to fit over the rear crossbar 14, is provided in the rear of the fuel tank 230. Each of the front and rear recesses 232 and 234, includes a Velcro® strip 236 for interlocking with a corresponding Velcro® strip on the front and rear crossbars 13 and 14 (not shown). The fuel tank 230 can be easily removed or attached to the frame F, as desired. Although not shown, the fuel tank can be incorporated in the frame F or be integral therewith.

OPERATION

The use and operation of the vehicle of the invention will now be explained.

As described above, the vehicle of the invention includes a manual or chain drive assembly 34 (FIG. 3) which is completely separate and independent from the power drive assembly 44. Therefore, the vehicle can be easily ridden by using pedal power only, or by using the motor power only. In this regard, it would be apparent to one of ordinary skill in the art that in the manual (pedal) power mode, there would be no need to start the motor 50, or the motor may be completely removed from the transaxle unit 54. If it is desired to use the vehicle of the invention in the power mode, the motor would be started and the drive sprocket 74 would be engaged with the output shaft 70 by actuating the connect/disconnect mechanism 76. In the power mode, the user may also use the pedal power at any time, as desired, thereby using a combination of manual and motor powers.

In order to switch from the manual power to the motor power, a user would manually actuate the connect/disconnect mechanism 76 to engage the drive sprocket 74, before or after starting the motor, as noted above.

The operation of the transmission 72 will now be described by referring to FIGS. 20–29. As the input drive shaft 130 from the motor 50 begins to turn (arrow A in FIG. 20), the clutch housing 140 begins to turn and as the motor rpm increases, the clutch plate 144 of the low-speed clutch 116 opens due to the centrifugal force and engages the clutch housing 140 (arrows B in FIG. 21). The rotation of the clutch 116 is transferred to the low-speed drive gear 148 (arrows C in FIG. 21), and it begins to turn the low-speed driven gear 152 (arrow D in FIGS. 22 and 28). The rotational movement of the low-speed driven gear 152 is transferred to the drive shaft 128 (arrow E in FIG. 23) which begins to rotate at a low speed (arrow F in FIGS. 23 and 28). Since the upper, high-speed driven gear 156 is connected to the drive shaft 128, the gear 156 begins to rotate and transfers the movement to the upper, high-speed drive gear 154 (arrows G in FIG. 24). The rotation of the high-speed drive gear 154 causes the lower, high-speed clutch 118 to rotate and open (arrows H and I in FIG. 24). The plate 144 of the clutch 118 opens completely as the motor rpm increases (see arrows J in FIG. 25). When the high-speed clutch 118 opens, the low-speed driven gear 152 goes in the idle mode, and the high speed driven gear 156 rotates at a high speed (see arrow K in FIG. 26) to thereby drive the shaft 128 at a higher speed, which, in turn, powers the output shaft 70 (see arrow L in FIGS. 27 and 29).

From the above, it can be observed that the provision of two clutches 116 and 120 and two gear clusters 120 and 122, results in two different gear ratios for low and high speeds. It is noted that the gear clusters may be changed to provide for different ratios for achieving desired speeds.

It can be further observed from the above, that since the manual drive and power drive assemblies are separate and independent, and the transmission is a full-time, direct driveline (always engaged) providing no freewheeling arrangement, when the vehicle of the invention is switched from the manual power to motor power, there is no abrupt engagement of any of the components in the power assembly, as all drive components (the motor, transmission, output shaft, and the rear wheel) are at a same speed. In other words, all drive components of the vehicle, i.e., the motor, transmission, output shaft, drive sprocket, rear wheel driven sprocket, and the rear wheel, are all directly engaged or connected to each other. This unique construction and arrangement results in a transmission with high durability, and better control and enhanced maneuverability of the vehicle by a user.

Although the present invention has been described as a rear-wheel drive vehicle, it is within the scope of this invention to provide a front-wheel or an all-wheel drive vehicle.

While this invention has been described as having preferred sequences, ranges, steps, materials, or designs, it is understood that it includes further modifications, variations, uses and/or adaptations thereof following in general the principle of the invention, and including such departures from the present disclosure as those come within the known or customary practice in the art to which the invention pertains, and as may be applied to the central features herein before set forth, and fall within the scope of the invention and of the limits of the appended claims.

What is claimed is:

1. A personal transport vehicle, comprising:

a) a frame including front and rear suspensions;

b) said front suspension for supporting a front wheel;

c) said rear suspension for supporting a rear wheel for up and down movement relative to said frame;

d) a manual drive assembly operably connected to said frame;

e) a power drive assembly forming a part of said rear suspension;

f) said power drive assembly including a drive motor and a transaxle unit;

g) said drive motor removably connected to said transaxle unit;

h) said drive motor including an output axle; and i) said output axle extending in a plane generally common with a vertical plane of said frame.

2. The personal transport vehicle of claim 1, wherein:

a) said power drive assembly is pivotally connected to said frame.

3. The personal transport vehicle of claim 2, wherein:

a) said power drive assembly is further connected to said frame by spring means.

4. The personal transport vehicle of claim 1, wherein:

a) said power drive assembly comprises a full-time driveline.

5. The personal transport vehicle of claim 4, wherein:

a) said power drive assembly includes a transaxle and said drive motor is connected directly to said transaxle.

6. The personal transport vehicle of claim 1, wherein:

a) said output shaft axle extends downwardly to be operably connected to said transaxle unit.

7. The personal transport vehicle of claim 1, further comprising:

a) a swing arm for connecting said transaxle unit and said rear wheel.

8. The personal transport vehicle of claim 7, wherein:

a) said power drive assembly, said swing arm, and said rear wheel form an integrated unit.

9. The personal transport vehicle of claim 1, wherein:

a) said transaxle unit includes a drive sprocket;

b) said rear wheel includes a driven sprocket; and c) the distance between said drive and driven sprockets remains substantially constant during operation of said rear suspension.

10. The personal transport vehicle of claim 1, wherein:

a) said transaxle unit is positioned substantially centrally of said frame.

11. The personal transport vehicle of claim 1, wherein:

a) said frame includes means for supporting a seat.

12. The personal transport vehicle of claim 1, wherein the vehicle comprises a bicycle.

13. The personal transport vehicle of claim 1, wherein:

a) said manual drive assembly is separate from said power drive assembly.

14. The personal transport vehicle of claim 13, wherein:

a) said manual drive assembly includes a pedal axle and said power drive assembly includes an output shaft; and b) said pedal axle and said output shaft extend in a generally common vertical plane.

15. The personal transport vehicle of claim 13, wherein:

a) said power drive assembly includes an output shaft;

b) said rear wheel includes a driven axle; and c) said output shaft and said driven axle extend in a generally common horizontal plane.

16. The personal transport vehicle of claim 13, wherein:

a) said manual drive assembly includes a first drive chain and said power drive assembly includes a second drive chain.

17. The personal transport vehicle of claim 16, wherein:

a) one of said first and second drive chains is located on one side of said frame and the other of said first and second drive chains is located on the other side of said frame.

18. A bicycle, comprising:

a) a frame including front and rear suspensions;

b) said front suspension for supporting a front wheel;

c) said rear suspension for supporting a rear wheel;

d) a manual drive assembly operably connected to said frame;

e) a power drive assembly forming a part of said rear suspension;

f) said power drive assembly comprising a full-time driveline;

g) said power drive assembly including a drive motor and a transaxle unit;

h) said drive motor removably connected to said transaxle unit;

i) said drive motor including an output axle; and j) said output axle extending in a plane generally common with a vertical plane of said frame.

19. The bicycle of claim 18, wherein:

a) said power drive assembly is pivotally connected to said frame.

20. The bicycle of claim 19, wherein:

a) said power drive assembly is further connected to said frame by spring means.

21. The bicycle of claim 18, wherein:

a) said output axle extends downwardly to be operably connected to said transaxle unit.

22. The bicycle of claim 18, further comprising:

a) a swing arm for connecting said transaxle unit and said rear wheel.

23. The bicycle of claim 22, wherein:

a) said power drive assembly, said swing arm, and said rear wheel form an integrated unit.

24. The bicycle of claim 18, wherein:

a) said transaxle unit includes a drive sprocket;

b) said rear wheel includes a driven sprocket; and c) the distance between said drive and driven sprockets remains substantially constant during operation of said rear suspension.

25. The bicycle of claim 18, wherein:

a) said transaxle unit is positioned substantially centrally of said frame.

26. The bicycle of claim 18, wherein:

a) said frame includes means for supporting a seat.

27. The bicycle of claim 18, wherein:

a) said manual drive assembly is separate from said power drive assembly.

28. The bicycle of claim 27, wherein:

a) said manual drive assembly includes a pedal axle and said power drive assembly includes an output shaft; and b) said pedal axle and said output shaft extend in a generally common vertical plane.

29. The bicycle of claim 27, wherein:

a) said power drive assembly includes an output shaft;

b) said rear wheel includes a driven axle; and c) said output shaft and said driven axle extend in a generally common horizontal plane.

30. The bicycle of claim 27, wherein:

a) said manual drive assembly includes a first drive chain and said power drive assembly includes a second drive chain.

31. The bicycle of claim 30, wherein:

a) one of said first and second drive chains is located on one side of said frame and the other of said first and second drive chains is located on the other side of said frame.

32. The bicycle of claim 18, wherein:

a) said power drive assembly includes a transaxle and said drive motor is connected directly to said transaxle.

33. The bicycle of claim 18, wherein:

a) said transaxle unit comprises a transmission and an output shaft;

b) said transmission comprises a centrifugal clutch, and first and second gear clusters with first and second gear ratios to thereby provide first and second speeds;

c) a drive sprocket connected to said output shaft;

d) said drive sprocket is connected to a rear wheel sprocket by a link member; and e) said drive sprocket and said rear wheel sprocket each comprises a non-freewheel sprocket.

34. A personal transport vehicle, comprising:

a) a frame including front and rear suspensions;

b) said front suspension for supporting a front wheel;

c) said rear suspension for supporting a rear wheel for up and down movement relative to said frame;

d) a manual drive assembly operably connected to said frame;

e) a power drive assembly forming a part of said rear suspension;

f) said power drive assembly including a drive motor and a transaxle unit;

g) said drive motor removably connected to said transaxle unit;

h) said frame including means for supporting a seat; and i) said drive motor positioned rearwardly of said seat supporting means.

35. The personal transport vehicle of claim 34, wherein:

a) said transaxle unit is positioned substantially centrally of said frame.

36. The personal transport vehicle of claim 34, wherein:

a) said seat supporting means includes a seat post;

b) said drive motor includes an output axle; and c) said seat post and said output axle extend generally parallel to each other.

37. A bicycle, comprising:

a) a frame including front and rear suspensions;

b) said front suspension for supporting a front wheel;

c) said rear suspension for supporting a rear wheel;

d) a manual drive assembly operably connected to said frame;

e) a power drive assembly forming a part of said rear suspension;

f) said power drive assembly comprising a full-time driveline;

g) said power drive assembly including a drive motor and a transaxle unit;

h) said drive motor removably connected to said transaxle unit;

i) said frame including means for supporting a seat; and j) said drive motor positioned rearwardly of said seat supporting means.

38. The bicycle of claim 37, wherein:

a) said transaxle unit is positioned substantially centrally of said frame.

39. The bicycle of claim 37, wherein:

a) said seat supporting means includes a seat post;

b) said drive motor includes an output axle;

c) said seat post and said output axle extend generally parallel to each other.

40. A bicycle, comprising:

a) a frame including front and rear suspensions;

b) said front suspension for supporting a front wheel;

c) said rear suspension for supporting a rear wheel;

d) a manual drive assembly operably connected to said frame;

e) a power drive assembly forming a part of said rear suspension;

f) said power drive assembly comprising a full-time driveline;

g) said power drive assembly including a drive motor and a transaxle unit;

h) said drive motor removably connected to said transaxle unit;

i) said transaxle unit comprising a transmission and an output shaft;

j) said transmission comprising a centrifugal clutch, and first and second gear clusters with first and second gear ratios to thereby provide first and second speeds;

k) a drive sprocket connected to said output shaft;

l) said drive sprocket connected to a rear wheel sprocket by a link member; and m) said drive sprocket and said rear wheel sprocket each comprising a non-freewheel sprocket.

* * * * *